(12) United States Patent
Tsai et al.

(10) Patent No.: US 8,891,183 B2
(45) Date of Patent: Nov. 18, 2014

(54) IMAGE LENS ASSEMBLY

(71) Applicant: Largan Precision Co., Ltd., Taichung (TW)

(72) Inventors: Tsung-Han Tsai, Taichung (TW); Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 95 days.

(21) Appl. No.: 13/663,602

(22) Filed: Oct. 30, 2012

(65) Prior Publication Data

US 2013/0335834 A1   Dec. 19, 2013

(30) Foreign Application Priority Data

Jun. 19, 2012  (TW) .............................. 101121925 A

(51) Int. Cl.
*G02B 9/62* (2006.01)
*G02B 13/18* (2006.01)
*G02B 3/02* (2006.01)

(52) U.S. Cl.
USPC .......................................... 359/756; 359/713

(58) Field of Classification Search
CPC ........ G02B 9/62; G02B 13/002; G02B 13/18; G02B 13/0045
USPC .......................................... 359/756, 757, 713
See application file for complete search history.

(56) References Cited

U.S. PATENT DOCUMENTS

2012/0050892 A1* 3/2012 Lai et al. ..................... 359/786

* cited by examiner

*Primary Examiner* — Alicia M Harrington
(74) *Attorney, Agent, or Firm* — CKC & Partners Co., Ltd.

(57) ABSTRACT

An image lens assembly includes, in order from an object side to an image side, a first lens element, a second lens element, a third lens element, a fourth lens element, a fifth lens element and a sixth lens element. The first lens element with positive refractive power has a convex object-side surface. The second lens element has refractive power. The third lens element has positive refractive power. The fourth lens element has negative refractive power. The fifth lens element with positive refractive power has a convex object-side surface and a concave image-side surface. The sixth lens element with positive refractive power has a convex object-side surface and a concave image-side surface, wherein the image-side surface thereof changes from concave at a paraxial region to convex at a peripheral region. The fifth and sixth lens elements are made of plastic, and the surfaces thereof are aspheric.

23 Claims, 14 Drawing Sheets

IMAGE LENS ASSEMBLY

RELATED APPLICATIONS

The application claims priority to Taiwan Application Serial Number 101121925, filed Jun. 19, 2012, which is herein incorporated by reference.

BACKGROUND

1. Technical Field

The present invention relates to an image lens assembly. More particularly, the present invention relates to a compact image lens assembly applicable to electronic products.

2. Description of Related Art

In recent years, with the popularity of mobile products with camera functionalities, the demand of miniaturized optical lens systems is increasing. The sensor of a conventional photographing camera is typically a CCD (Charge-Coupled Device) or a CMOS (Complementary Metal-Oxide Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a structure of four-element lens such as the one disclosed in U.S. Pat. No. 7,869,142. Due to the popularity of mobile products with high-end specifications, such as smart phones and PDAs (Personal Digital Assistants), the requirements for high resolution and image quality of modern compact optical lens systems has been increasing significantly. However, the conventional four-element lens structure cannot satisfy these requirements of optical lens system with high-end specifications.

Although other conventional optical lens systems with five-element lens structure such as the ones disclosed in U.S. Pat. No. 8,000,031 enhance image quality, two lens elements of the optical lens system which closest to an image plane do not have positive refractive power, so that the incident angle of the off-axis light onto the two lens elements (a fourth lens element and a fifth lens element) cannot be effectively suppressed. Therefore, the high order aberration will be generated easily by the excessive refractive angle of the incident light and the Relative Illumination at a peripheral region of the image cannot be maintained.

SUMMARY

According to one aspect of the present disclosure, an image lens assembly includes, in order from an object side to an image side, a first lens element, a second lens element, a third lens element, a fourth lens element, a fifth lens element and a sixth lens element. The first lens element with positive refractive power has a convex object-side surface. The second lens element has refractive power. The third lens element has positive refractive power. The fourth lens element has negative refractive power. The fifth lens element with positive refractive power is made of plastic material, and has a convex object-side surface and a concave image-side surface, wherein the object-side surface and the image-side surface of the fifth lens element are aspheric. The sixth lens element with positive refractive power is made of plastic material, and has a convex object-side surface and a concave image-side surface, wherein the image-side surface of the sixth lens element changes from concave at a paraxial region to convex at a peripheral region, and the object-side surface and the image-side surface of the sixth lens element are aspheric. When a focal length of the image lens assembly is f, a focal length of the fifth lens element is f5, and a focal length of the sixth lens element is f6, the following relationships are satisfied:

$$0 < f/f6 < 0.9; \text{ and}$$

$$0.4 < (f/f5) + (f/f6) < 1.9.$$

According to another aspect of the present disclosure, an image lens assembly includes, in order from an object side to an image side, a first lens element, a second lens element, a third lens element, a fourth lens element, a fifth lens element and a sixth lens element. The first lens element with positive refractive power has a convex object-side surface. The second lens element has refractive power. The third lens element has positive refractive power. The fourth lens element with negative refractive power has a concave object-side surface and a convex image-side surface. The fifth lens element with positive refractive power is made of plastic material, and has a convex object-side surface, wherein the object-side surface and an image-side surface of the fifth lens element are aspheric. The sixth lens element with positive refractive power is made of plastic material, and has a convex object-side surface and a concave image-side surface, wherein the image-side surface of the sixth lens element changes from concave at a paraxial region to convex at a peripheral region, and the object-side surface and the image-side surface of the sixth lens element are aspheric. When a focal length of the image lens assembly is f, a focal length of the fifth lens element is f5, and a focal length of the sixth lens element is f6, the following relationships are satisfied:

$$0 < f5/f6 < 1.0; \text{ and}$$

$$0.4 < (f/f5) + (f/f6) < 1.9.$$

According to yet another aspect of the present disclosure, an image lens assembly includes, in order from an object side to an image side, a first lens element, a second lens element, a third lens element, a fourth lens element, a fifth lens element and a sixth lens element. The first lens element with positive refractive power has a convex object-side surface. The second lens element has refractive power. The third lens element has positive refractive power. The fourth lens element has negative refractive power. The fifth lens element with positive refractive power is made of plastic material, and has a convex object-side surface, wherein the object-side surface and an image-side surface of the fifth lens element are aspheric. The sixth lens element with positive refractive power is made of plastic material, and has a convex object-side surface and a concave image-side surface, wherein the image-side surface of the sixth lens element changes from concave at a paraxial region to convex at a peripheral region, and the object-side surface and the image-side surface of the sixth lens element are aspheric. When a focal length of the image lens assembly is f, a focal length of the fourth lens element is f4, and a focal length of the sixth lens element is f6, the following relationships are satisfied:

$$0 < f/f6 < 0.9; \text{ and}$$

$$-2.2 < f/f4 < -0.75.$$

DETAILED DESCRIPTION

Figure 1:
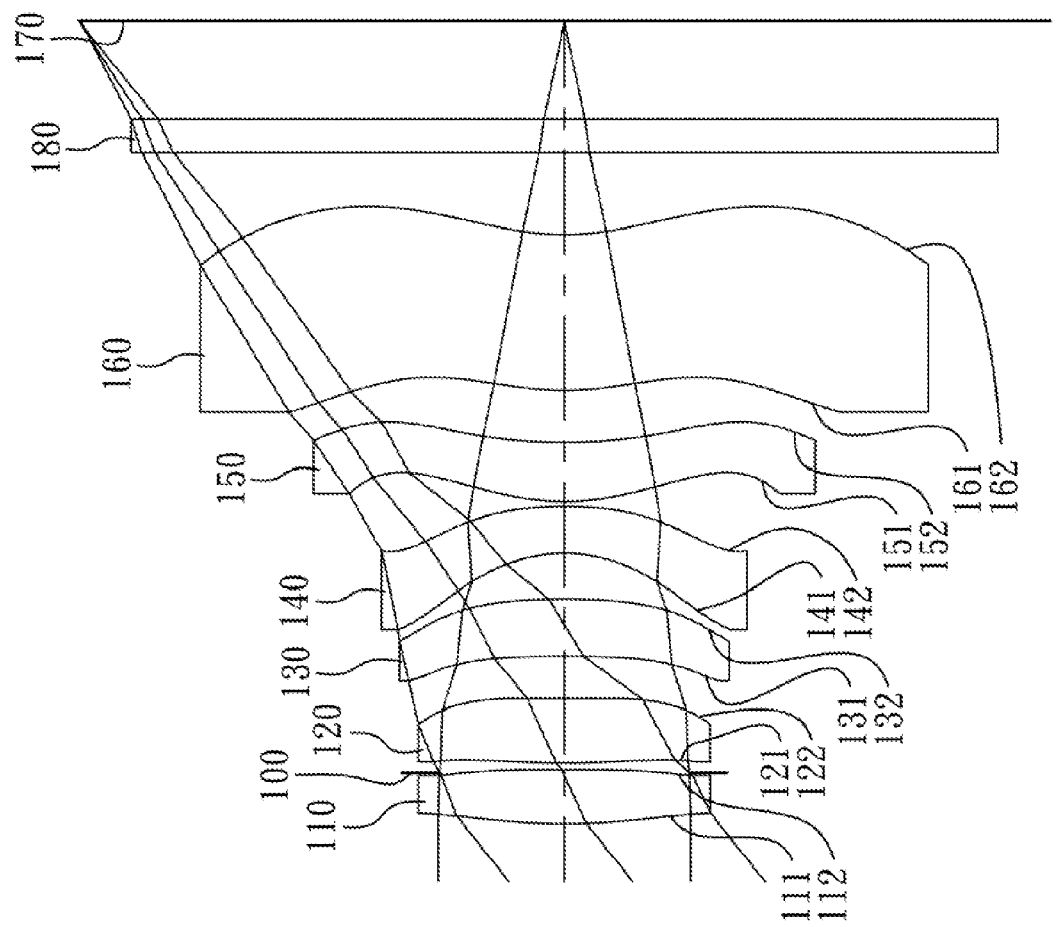
FIG. 1 is a schematic view of an image lens assembly according to the 1st embodiment of the present disclosure.

An image lens assembly includes, in order from an object side to an image side, a first lens element, a second lens element, a third lens element, a fourth lens element, a fifth lens element and a sixth lens element.

The first lens element with positive refractive power has a convex object-side surface, so that the total track length of the image lens assembly can be reduced by adjusting the positive refractive power of the first lens element.

The third lens element with positive refractive power can balance the distribution of the positive refractive power of the image lens assembly for reducing the sensitivity thereof.

The fourth lens element with negative refractive power has a concave object-side surface and a convex image-side surface, so that the aberration generated from the first through third lens elements with positive refractive power can be corrected, and the astigmatism of the image lens assembly can also be corrected.

The fifth lens element with positive refractive power has a convex object-side surface and a concave image-side surface, so that the high order aberration of the image lens assembly can be corrected for enhancing the resolution thereof and obtaining high image quality. Furthermore, the object-side surface of the fifth lens element changes from convex at a paraxial region to concave at a peripheral region, and the image-side surface of the fifth lens element changes from concave at a paraxial region to convex at a peripheral region. Therefore, the angle at which the incident light projects onto an image sensor from the off-axis field can be effectively reduced, and the aberration of the off-axis field can be further corrected.

The sixth lens element with positive refractive power combines with the positive refractive power of the fifth lens element for reducing the incident angle of the light onto the fifth lens element and the sixth lens element which being aspheric, so that the refractive angle of the light can be reduced, and the high order aberration can be also reduced. The sixth lens element has a convex object-side surface and a concave image-side surface, wherein the image-side surface of the sixth lens element changes from concave at a paraxial region to convex at a peripheral region. Therefore, the astigmatism of the image lens assembly can be corrected, and the angle at which the incident light projects onto the image sensor from the off-axis field can be effectively reduced, and the aberration of the off-axis field can be further corrected. Furthermore, when a central thickness of the first lens element is CT1, a central thickness of the second lens element is CT2, a central thickness of the third lens element is CT3, a central thickness of the fourth lens element is CT4, a central thickness of the fifth lens element is CT5, and a central thickness of the sixth lens element is CT6, CT6 is the thickest among CT1, CT2, CT3, CT4, CT5 and CT6. Therefore, it is favorable for shaping and manufacturing of the lens elements and better image quality.

When a focal length of the image lens assembly is f, and a focal length of the sixth lens element is f6, the following relationship is satisfied:

$$0 < f/f6 < 0.9.$$

Therefore, the sensitivity of the image lens assembly can be reduced by adjusting the positive refractive power of the sixth lens element, and the manufacturing yield rate of the lens elements can be increased.

When the focal length of the image lens assembly is f, a focal length of the fifth lens element is f5, and the focal length of the sixth lens element is f6, the following relationship is satisfied:

$$0.4 < (f/f5) + (f/f6) < 1.9.$$

Therefore, the refractive angle of the incident light can be reduced by properly distributing the positive refractive power of the fifth lens element and the sixth lens element, so that the high order aberration can be reduced for enhancing the image quality. Moreover, the angle at the peripheral region on the surfaces of the fifth lens element and the sixth lens element would not be excessive for maintaining the relative illumination at the peripheral region of the image.

When an Abbe number of the fourth lens element is V4, and an Abbe number of the fifth lens element is V5, the following relationship is satisfied:

$$0.2 < V4/V5 < 0.6.$$

Therefore, the chromatic aberration of the image lens assembly can be corrected.

When a curvature radius of the image-side surface of the sixth lens element is R12, and the focal length of the image lens assembly is f, the following relationship is satisfied:

$$0.30 < R12/f < 0.75.$$

Therefore, the principal point of the image lens assembly can be positioned away from the image plane by properly adjusting the curvature of the image-side surface of the sixth lens element, and the back focal length thereof can be reduced so as to maintain the compact size of the image lens assembly.

When a focal length of the first lens element is f1, and a focal length of the second lens element is f2, the following relationship is satisfied:

$$-0.8 < f1/f2 < 1.4.$$

Therefore, the sensitivity or the aberration of the image lens assembly can be reduced by properly adjusting the refractive power of the first lens element and the second lens element.

When a curvature radius of the object-side surface of the third lens element is R5, and a curvature radius of the image-side surface of the third lens element is R6, the following relationship is satisfied:

$$0 < |R6/R5| < 0.95.$$

Therefore, the distribution of the positive refractive power of the image lens assembly can be balanced by properly adjusting the curvature of the object-side surface and the image-side surface of the third lens element for reducing the sensitivity of the image lens assembly.

When the focal length of the image lens assembly is f, a focal length of the first lens element is f1, a focal length of the second lens element is f2, a focal length of the third lens element is f3, the focal length of the fifth lens element is f5, the focal length of the sixth lens element is f6, and when the lens elements have positive refractive power, the following relationship is satisfied:

$$0 < f/fi < 1.0, i=1,2,3,5 \text{ or } 6.$$

Therefore, it is favorable for reducing the sensitivity of the assembly and for avoiding the spherical aberration and aberration generated from overloading the refractive power on one single lens by balancing the distribution of the positive refractive power.

When the focal length of the fifth lens element is f5, and the focal length of the sixth lens element is f6, the following relationship is satisfied:

$$0 < f5/f5 < 1.0.$$

Therefore, the high order aberration of the image lens assembly can be reduced by balancing the distribution of the positive refractive power of the fifth lens element and the sixth lens element, and the manufacturing yield rate can be increased.

f5 and f6 can further satisfy the following relationship:

$$0 < f5/f6 < 0.60.$$

When the focal length of the image lens assembly is f, and the focal length of the fourth lens element is f4, the following relationship is satisfied:

$$-2.2 < f/f4 < -0.75.$$

Therefore, the aberration generated from the first through third lens elements with positive refractive power can be corrected by the proper distribution of the negative refractive power of the fourth lens element.

According to the image lens assembly of the present disclosure, the lens elements thereof can be made of glass or plastic material. When the lens elements are made of glass material, the distribution of the refractive power of the image lens assembly may be more flexible to design. When the lens elements are made of plastic material, the manufacturing cost can be effectively reduced. Furthermore, surfaces of each lens element can be aspheric, so that it is easier to make the surfaces into non-spherical shapes. As a result, more controllable variables are obtained, and the aberration is reduced, as well as the number of required lens elements can be reduced while constructing an optical system. Therefore, the total track length of the image lens assembly can also be reduced.

Each of an object-side surface and an mage-side surface of every lens element has a paraxial region and a peripheral region. The paraxial region refers to the region of the surface where light rays travel close to an optical axis and the peripheral region refers to the region of the surface where light rays travel away from the optical axis. Particularly, when the lens element has a convex surface, it indicates that the paraxial region of the surface is convex; and when the lens element has a concave surface, it indicates that the paraxial region of the surface is concave.

According to the image lens assembly of the present disclosure, the image lens assembly can include at least one stop, such as an aperture stop, a glare stop, or a field stop, etc. Said glare stop or said field stop is allocated for reducing stray light while retaining high image quality. Furthermore, an aperture stop can be configured as a front stop or a middle stop. A front stop which can be disposed between an object and the first lens element provides a longer distance from an exit pupil of the system to an image plane and thereby the generated telecentric effect improves the image-sensing efficiency of an image sensor. A middle stop which can be disposed between the first lens element and an image plane is favorable for enlarging the field of view of the system and thereby provides a wider field of view for the same.

According to the above description of the present disclosure, the following 1st-7th specific embodiments are provided for further explanation.

1st Embodiment

Figure 2:
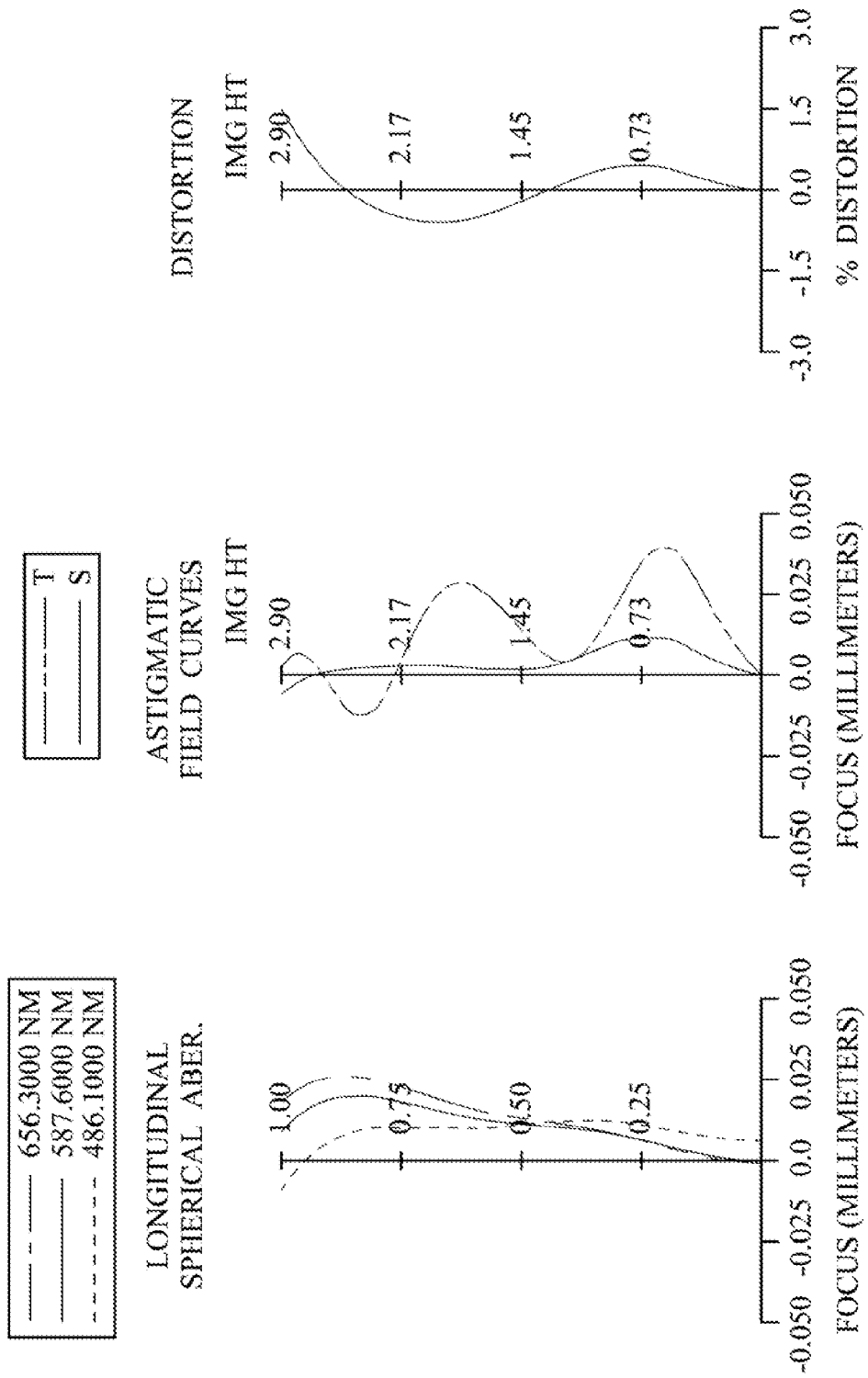
FIG. 2 shows spherical aberration curves, astigmatic field curves and a distortion curve of the image lens assembly according to the 1st embodiment.

FIG. 1 is a schematic view of an image lens assembly according to the 1st embodiment of the present disclosure. FIG. 2 shows spherical aberration curves, astigmatic field curves and a distortion curve of the image lens assembly according to the 1st embodiment. In FIG. 1, the image lens assembly includes, in order from an object side to an image side, a first lens element 110, an aperture stop 100, a second lens element 120, a third lens element 130, a fourth lens element 140, a fifth lens element 150, a sixth lens element 160, an IR-cut filter 180 and an image plane 170.

The first lens element 110 with positive refractive power has a convex object-side surface 111 and a convex image-side surface 112. The first lens element 110 is made of plastic material and has the object-side surface 111 and the image-side surface 112 being aspheric.

The second lens element 120 with positive refractive power has a convex object-side surface 121 and a convex image-side surface 122. The second lens element 120 is made of plastic material and has the object-side surface 121 and the image-side surface 122 being aspheric.

The third lens element 130 with positive refractive power has a concave object-side surface 131 and a convex image-side surface 132. The third lens element 130 is made of plastic material and has the object-side surface 131 and the image-side surface 132 being aspheric.

The fourth lens element 140 with negative refractive power has a concave object-side surface 141 and a convex image-side surface 142. The fourth lens element 140 is made of plastic material and has the object-side surface 141 and the image-side surface 142 being aspheric.

The fifth lens element 150 with positive refractive power has a convex object-side surface 151 and a concave image-side surface 152, wherein the object-side surface 151 of the fifth lens element 150 changes from convex at a paraxial region to concave at a peripheral region, and the image-side surface 152 of the fifth lens element 150 changes from concave at a paraxial region to convex at a peripheral region. The fifth lens element 150 is made of plastic material and has the object-side surface 151 and the image-side surface 152 being aspheric.

The sixth lens element 160 with positive refractive power has a convex object-side surface 161 and a concave image-side surface 162, wherein the image-side surface 162 of the sixth lens element 160 changes from concave at a paraxial region to convex at a peripheral region. The sixth lens element 160 is made of plastic material and has the object-side surface 161 and the image-side surface 162 being aspheric.

Moreover, when a central thickness of the first lens element 110 is CT1, a central thickness of the second lens element 120 is CT2, a central thickness of the third lens element 130 is CT3, a central thickness of the fourth lens element 140 is CT4, a central thickness of the fifth lens element 150 is CT5, and a central thickness of the sixth lens element 160 is CT6, CT6 is the thickest among CT1, CT2, CT3, CT4, CT5 and CT6.

The IR-cut filter 180 is made of glass, and located between the sixth lens element 160 and the image plane 170, and will not affect the focal length of the image lens assembly.

The equation of the aspheric surface profiles of the aforementioned lens elements of the βst embodiment is expressed as follows:

$$X(Y)=(Y^2/R)/(1+\mathrm{sqrt}(1-(1+k)\times(Y/R)^2))+\Sigma(Ai)\times(Y^i),$$

wherein,

X is the relative distance between a point on the aspheric surface spaced at a distance Y from the optical axis and the tangential plane at the aspheric surface vertex on the optical axis;

Y is the distance from the point on the curve of h aspheric: surface to the optical axis;

R is the curvature radius:

k is the conic coefficient; and

Ai is the i-th aspheric coefficient.

In the image lens assembly according to the 1st embodiment, when a focal length of the image lens assembly is f, an f-number of the image lens assembly is Fno, and half of the maximal field of view of the image lens assembly is HFOV, these parameters have the following values:

f=3.61 mm;

Fno=2.40; and

HFOV=38.2 degrees.

In the image lens assembly according to the 1st embodiment, when an Abbe number of the fourth lens element 140 is V4, and an Abbe number of the fifth lens element 150 is V5, the following relationship is satisfied:

$$V4/V5=0.41,$$

In the image lens assembly according to the 1st embodiment, when a curvature radius of the object-side surface 131 of the third lens element 130 is R5, and a curvature radius of the image-side surface 132 of the third lens element 130 is R6, the following relationship is satisfied $$|R6/R5|=0.35.$$

In the image lens assembly according to the 1st embodiment, when a curvature radius of the image-side surface 162 of the sixth lens element 160 is R12, and the focal length of the image lens assembly is f, the following relationship is satisfied:

$$R12/f=0.43.$$

In the image lens assembly according to the 1st embodiment, when a focal length of the first lens element 110 is f1, and a focal length of the second lens element 120 is f2, the following relationship is satisfied:

$$f1/f2=0.72.$$

In the image lens assembly according to the 1st embodiment, when the focal length of the image lens assembly is f, and a focal length of the fourth lens element 140 is f4, the following relationship is satisfied:

$$f/f4=-1.54.$$

In the image lens assembly according to the 1st embodiment, when the focal length of the image lens assembly is f, a focal length of the fifth lens element 150 is f5, and a focal length of the sixth lens element 160 is f6, the following relationships are satisfied:

$$f5/f6=0.17;$$

$$(f/f5)+(f/f6)=1.04; \text{ and}$$

$$f/f6=0.15.$$

In the image lens assembly according to the 1st embodiment, when the focal length of the image lens assembly is f, a focal length of the first lens element 110 is f1, a focal length of the second lens element 120 is f2, a focal length of the third lens element 130 is f3, the focal length of the fifth lens to element 150 is f5, the focal length of the sixth lens element 160 is f6, and the lens elements (110-130, 150 and 160) have positive refractive power, the following relationship is satisfied:

$$0<f/fi<1.0, i=1,2,3,5 \text{ or } 6.$$

The detailed optical data of the 1st embodiment are shown in Table 1 and the aspheric surface data are shown in Table 2 below.

TABLE 1

1st Embodiment
f = 3.61 mm, Fno = 2.40, HFOV = 38.2 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 3.342 | (ASP) | 0.324 | Plastic | 1.544 | 55.9 | 6.12 |
| 2 | | -940.620 | (ASP) | -0.019 | | | | |
| 3 | Ape. Stop | Plano | | 0.059 | | | | |
| 4 | Lens 2 | 4.641 | (ASP) | 0.384 | Plastic | 1.544 | 55.9 | 8.45 |
| 5 | | -505.418 | (ASP) | 0.252 | | | | |
| 6 | Lens 3 | -11.967 | (ASP) | 0.342 | Plastic | 1.535 | 56.3 | 11.66 |
| 7 | | -4.139 | (ASP) | 0.271 | | | | |
| 8 | Lens 4 | -0.894 | (ASP) | 0.283 | Plastic | 1.640 | 23.3 | -2.35 |
| 9 | | -2.477 | (ASP) | 0.030 | | | | |
| 10 | Lens 5 | 1.434 | (ASP) | 0.350 | Plastic | 1.535 | 56.3 | 4.07 |
| 11 | | 3.847 | (ASP) | 0.313 | | | | |
| 12 | Lens 6 | 1.687 | (ASP) | 0.930 | Plastic | 1.535 | 56.3 | 24.05 |

TABLE 1-continued

1st Embodiment
f = 3.61 mm, Fno = 2.40, HFOV = 38.2 deg.

| Surface # | | Curvature Radius | | Thickness | Material | Index | Abbe # | Focal length |
|---|---|---|---|---|---|---|---|---|
| 13 | | 1.569 | (ASP) | 0.492 | | | | |
| 14 | IR-cut filter | Plano | | 0.200 | Glass | 1.517 | 64.2 | — |
| 15 | | Plano | | 0.583 | | | | |
| 16 | Image | Plano | | — | | | | |

Note:
Reference wavelength (d-line) is 587.6 nm.

TABLE 2

Aspheric Coefficients

| | Surface # | | | | | |
|---|---|---|---|---|---|---|
| | 1 | 2 | 4 | 5 | 6 | 7 |
| k = | −9.0793E+00 | −2.0000E+01 | −4.1759E+00 | 0.0000E+00 | 2.9780E+00 | −8.5821E−01 |
| A4 = | −5.7045E−02 | −2.9084E−01 | −2.8735E−01 | −2.1301E−01 | −1.6309E−01 | −1.3767E−01 |
| A6 = | −2.0636E−03 | 7.1715E−01 | 7.3227E−01 | −5.7416E−02 | −1.2119E−01 | −8.9367E−02 |
| A8 = | −5.1222E−02 | −1.3034E+00 | −1.4795E+00 | 1.3737E−02 | 1.7507E−02 | 2.1547E−02 |
| A10 = | 3.3114E−02 | 1.3217E+00 | 1.4482E+00 | −2.4556E−01 | 2.8645E−01 | 1.3800E−01 |
| A12 = | 2.9947E−02 | −4.9058E−01 | −6.6599E−01 | 4.4447E−01 | −2.4200E−01 | −1.8385E−01 |
| A14 = | | | | −2.4219E−01 | 1.1166E−01 | 1.1575E−01 |

| | Surface # | | | | | |
|---|---|---|---|---|---|---|
| | 8 | 9 | 10 | 11 | 12 | 13 |
| k = | −3.3423E+00 | 2.5122E+00 | −8.7031E+00 | 3.0000E+00 | −8.2524E+00 | −2.9176E+00 |
| A4 = | −3.3833E−01 | −3.1879E−01 | 7.8826E−02 | 1.7557E−01 | −1.9002E−01 | −1.8222E−01 |
| A6 = | 5.5427E−02 | 3.0804E−01 | −1.9025E−01 | −3.8131E−01 | 3.5324E−02 | 9.7623E−02 |
| A8 = | 5.6004E−01 | 1.3761E−02 | 9.2275E−02 | 3.0878E−01 | 1.8523E−02 | −4.2574E−02 |
| A10 = | −6.6750E−01 | −8.9913E−02 | −3.0406E−02 | −1.7157E−01 | −1.0336E−02 | 1.2934E−02 |
| A12 = | 4.4600E−01 | 9.1626E−02 | −9.2850E−04 | 6.0698E−02 | 2.2036E−03 | −2.4524E−03 |
| A14 = | −1.3678E−01 | −3.0292E−02 | 2.3757E−03 | −1.1501E−02 | −2.3069E−04 | 2.5592E−04 |
| A16 = | | | | 8.6055E−04 | 9.7129E−06 | −1.1161E−05 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
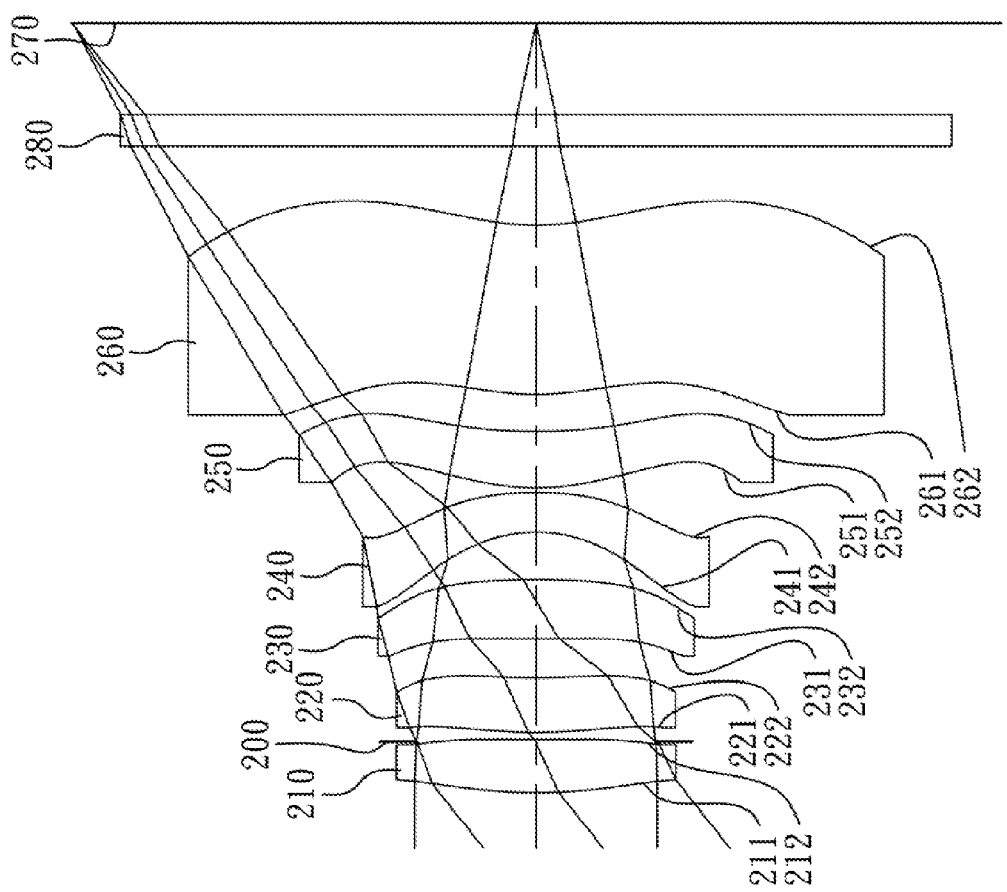
FIG. 3 is a schematic view of an image lens assembly according to the 2nd embodiment of the present disclosure.
Figure 4:
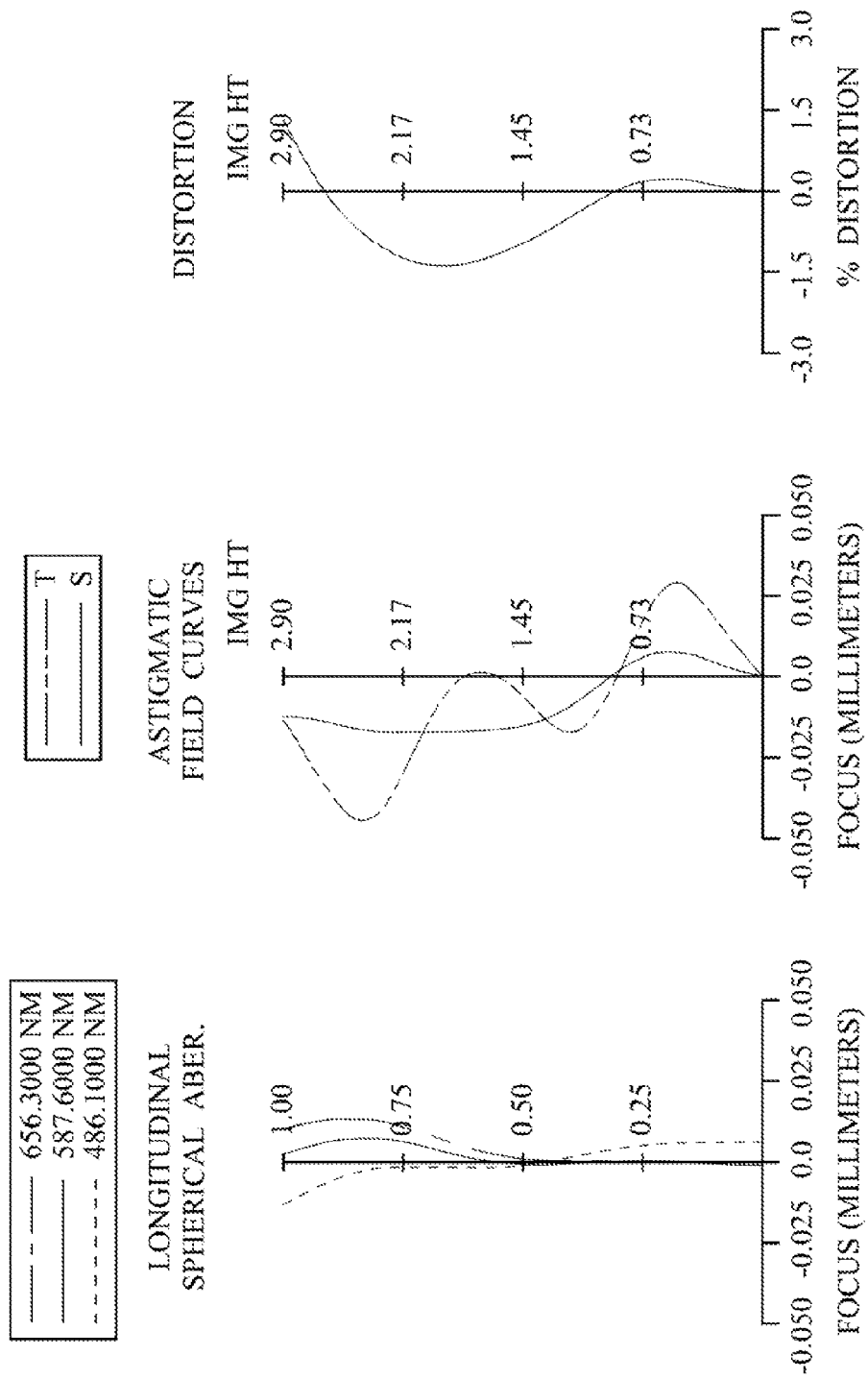
FIG. 4 shows spherical aberration curves, astigmatic field curves and a distortion curve of the image lens assembly according to the 2nd embodiment.

FIG. 3 is a schematic view of an image lens assembly according to the 2nd embodiment of the present disclosure. FIG. 4 shows spherical aberration curves, astigmatic field curves and a distortion curve of the image lens assembly according to the 2nd embodiment. In FIG. 3, the image lens assembly includes, in order from an object side to an image side, a first lens element 210, an aperture stop 200, a second lens element 220, a third lens element 230, a fourth lens element 240, a fifth lens element 250, a sixth lens element 260, an IR-cut filter 280 and an image plane 270.

The first lens element 210 with positive refractive power has a convex object-side surface 211 and a concave image-side surface 212. The first lens element 210 is made of plastic material and has the object-side surface 211 and the image-side surface 212 being aspheric.

The second lens element 220 with positive refractive power has a convex object-side surface 221 and a concave image-side surface 222. The second lens element 220 is made of plastic material and has the object-side surface 221 and the image-side surface 222 being aspheric.

The third lens element 230 with positive refractive power has a convex object-side surface 231 and a convex image-side surface 232. The third lens element 230 is made of plastic material and has the object-side surface 231 and the image-side surface 232 being aspheric.

The fourth lens element 240 with negative refractive power has a concave object-side surface 241 and a convex image-side surface 242. The fourth lens element 240 is made of plastic material and has the object-side surface 241 and the image-side surface 242 being aspheric.

The fifth lens element 250 with positive refractive power has a convex object-side surface 251 and a concave image-side surface 252, wherein the object-side surface 251 of the fifth lens element 250 changes from convex at a paraxial region to concave at a peripheral region, and the image-side surface 252 of the fifth lens element 250 changes from concave at a paraxial region to convex at a peripheral region. The fifth lens element 250 is made of plastic material and has the object-side surface 251 and the image-side surface 252 being aspheric.

The sixth lens element 260 with positive refractive power has a convex object-side surface 261 and a concave image-side surface 262, wherein the image-side surface 262 of the sixth lens element 260 changes from concave at a paraxial region to convex at a peripheral region. The sixth lens element 260 is made of plastic material and has the object-side surface 261 and the image-side surface 262 being aspheric.

Moreover, when a central thickness of the first lens element 210 is CT1, a central thickness of the second lens element 220 is CT2, a central thickness of the third lens element 230 is CT3, a central thickness of the fourth lens element 240 is CT4, a central thickness of the fifth lens element 250 is CT5, and a central thickness of the sixth lens element 260 is CT6, CT6 is the thickest among CT1, CT2, CT3, CT4, CT5 and CT6.

The IR-cut filter 280 is made of glass, and located between the sixth lens element 260 and the image plane 270, and will not affect the focal length of the image lens assembly.

The detailed optical data of the 2nd embodiment are shown in Table 3 and the aspheric surface data are shown in Table 4 below.

TABLE 3

2nd Embodiment
f = 3.64 mm, Fno = 2.40, HFOV = 38.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 3.068 | (ASP) | 0.333 | Plastic | 1.544 | 55.9 | 6.70 |
| 2 | | 18.670 | (ASP) | −0.013 | | | | |
| 3 | Ape. Stop | Plano | | 0.058 | | | | |
| 4 | Lens 2 | 2.914 | (ASP) | 0.339 | Plastic | 1.544 | 55.9 | 12.09 |
| 5 | | 5.018 | (ASP) | 0.245 | | | | |
| 6 | Lens 3 | 18.235 | (ASP) | 0.371 | Plastic | 1.535 | 56.3 | 8.16 |
| 7 | | −5.697 | (ASP) | 0.294 | | | | |
| 8 | Lens 4 | −0.873 | (ASP) | 0.250 | Plastic | 1.640 | 23.3 | −2.33 |
| 9 | | −2.347 | (ASP) | 0.030 | | | | |
| 10 | Lens 5 | 1.522 | (ASP) | 0.350 | Plastic | 1.535 | 56.3 | 4.29 |
| 11 | | 4.156 | (ASP) | 0.235 | | | | |
| 12 | Lens 6 | 1.683 | (ASP) | 1.059 | Plastic | 1.535 | 56.3 | 13.03 |
| 13 | | 1.733 | (ASP) | 0.492 | | | | |
| 14 | IR-cut filter | Plano | | 0.200 | Glass | 1.517 | 64.2 | — |
| 15 | | Plano | | 0.568 | | | | |
| 16 | Image | Plano | | — | | | | |

Note:
Reference wavelength (d-line) is 587.6 nm.

TABLE 4

Aspheric Coefficients

| | Surface # | | | | | |
|---|---|---|---|---|---|---|
| | 1 | 2 | 4 | 5 | 6 | 7 |
| k = | −1.3924E+00 | −2.0000E+01 | −1.3010E+01 | −2.0000E+01 | 3.0000E+00 | −2.0000E+01 |
| A4 = | −5.2500E−02 | −3.1855E−01 | −3.0303E−01 | −2.2169E−01 | −1.4398E−01 | −1.2830E−01 |
| A6 = | −2.0818E−02 | 7.5068E−01 | 7.4216E−01 | −4.4426E−02 | −1.4437E−01 | −1.0957E−01 |
| A8 = | −3.1008E−04 | −1.3334E+00 | −1.3891E+00 | 1.3708E−02 | −2.3496E−02 | 1.9360E−02 |
| A10 = | −3.2839E−02 | 1.2896E+00 | 1.2820E+00 | −2.6495E−01 | 2.7381E−01 | 1.0559E−01 |
| A12 = | 2.3271E−02 | −5.2782E−01 | −5.7226E−01 | 4.3824E−01 | −2.6173E−01 | −1.9418E−01 |
| A14 = | | | | −2.0015E−01 | 1.5014E−01 | 1.3708E−01 |

| | Surface # | | | | | |
|---|---|---|---|---|---|---|
| | 8 | 9 | 10 | 11 | 12 | 13 |
| k = | −3.4437E+00 | 1.8277E+00 | −9.4987E+00 | 3.0000E+00 | −9.7814E+00 | −2.6904E+00 |
| A4 = | −3.6403E−01 | −3.4389E−01 | 7.8826E−02 | 1.7557E−01 | −1.9002E−01 | −1.8222E−01 |
| A6 = | 6.9955E−02 | 3.2256E−01 | −1.9025E−01 | −3.8131E−01 | 3.5324E−02 | 9.7623E−02 |
| A8 = | 5.7268E−01 | 8.3909E−03 | 9.2275E−02 | 3.0878E−01 | 1.8523E−02 | −4.2574E−02 |
| A10 = | −6.7681E−01 | −7.8808E−02 | −3.0406E−02 | −1.7157E−01 | −1.0336E−02 | 1.2934E−02 |
| A12 = | 4.2769E−01 | 9.4618E−02 | −9.2850E−04 | 6.0698E−02 | 2.2036E−03 | −2.4524E−03 |
| A14 = | −1.1930E−01 | −3.5334E−02 | 2.3757E−03 | −1.1501E−02 | −2.3069E−04 | 2.5592E−04 |
| A16 = | | | | 8.6055E−04 | 9.7129E−06 | −1.1161E−05 |

In the optical image system according to the 2nd embodiment, the definitions of f, Fno, HFOV, V4, V5, R5, R6, R12, f1, f2, f4, f5 and f6 are the same as those stated in the 1st embodiment with corresponding values for the 2nd embodiment. Moreover, these parameters can be calculated from Table 3 and Table 4 as the following values and satisfy the following relationships:

| f (mm) | 3.64 | f1/f2 | 0.55 |
|---|---|---|---|
| Fno | 2.40 | f/f4 | −1.56 |
| HFOV (deg.) | 38.1 | f5/f6 | 0.33 |
| V4/V5 | 0.41 | (f/f5) + (f/f6) | 1.13 |
| |R6/R5| | 0.31 | f/f6 | 0.28 |
| R12/f | 0.48 | | |

Moreover, in the image lens assembly according to the 2nd embodiment, when the lens elements (210-230, 250 and 260) have positive refractive power, the following relationship is satisfied:

$$0 < f/fi < 1.0, i = 1, 2, 3, 5 \text{ or } 6.$$

3rd Embodiment

Figure 5:
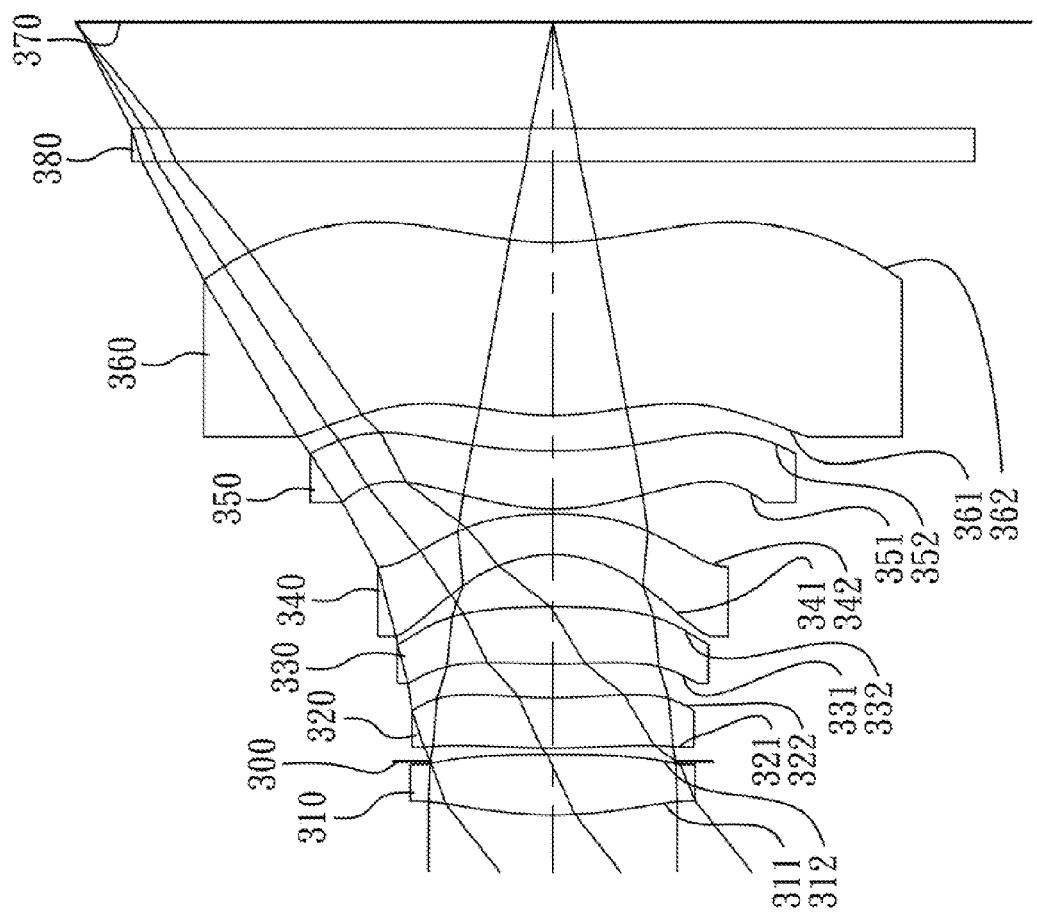
FIG. 5 is a schematic view of an image lens assembly according to the 3rd embodiment of the present disclosure.
Figure 6:
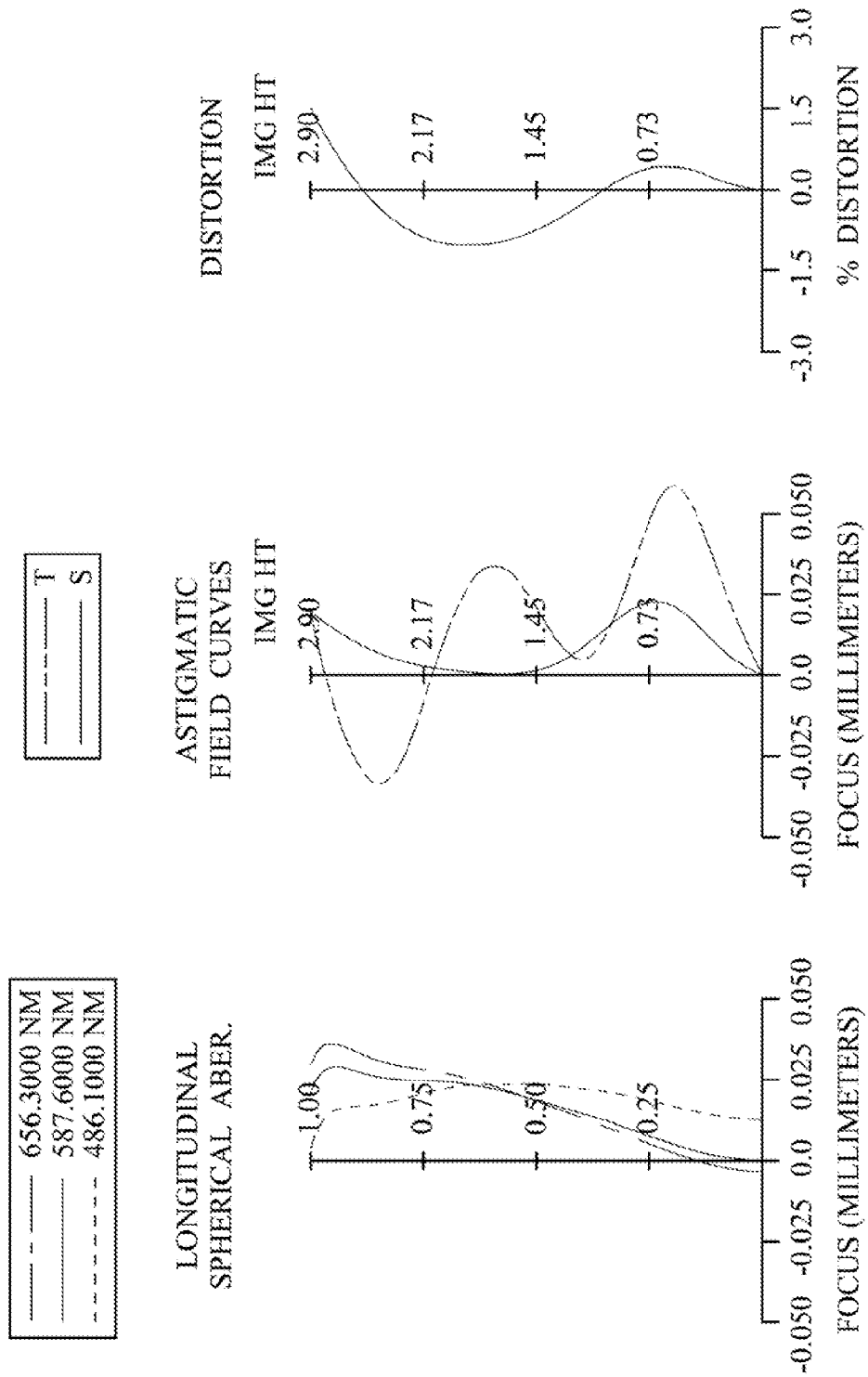
FIG. 6 shows spherical aberration curves, astigmatic field curves and a distortion curve of the image lens assembly according to the 3rd embodiment.

FIG. 5 is a schematic view of an image lens assembly according to the 3rd embodiment of the present disclosure. FIG. 6 shows spherical aberration curves, astigmatic field curves and a distortion curve of the image lens assembly according to the 3rd embodiment. In FIG. 5, the image lens assembly includes, in order from an object side to an image side, a first lens element 310, an aperture stop 300, a second lens element 320, a third lens element 330, a fourth lens element 340, a fifth lens element 350, a sixth lens element 360, an IR-cut filter 380 and an image plane 370.

The first lens element 310 with positive refractive power has a convex object-side surface 311 and a convex image-side surface 312. The first lens element 310 is made of plastic material and has the object-side surface 311 and the image-side surface 312 being aspheric.

The second lens element 320 with negative refractive power has a convex object-side surface 321 and a concave image-side surface 322. The second lens element 320 is made of plastic material and has the object-side surface 321 and the image side surface 322 being aspheric.

The third lens element 330 with positive refractive power has a convex object-side surface 331 and a convex image-side surface 332. The third lens element 330 is made of plastic material and has the object-side surface 331 and the image-side surface 332 being aspheric.

The fourth lens element 340 with negative refractive power has a concave object-side surface 341 and a convex image-side surface 342. The fourth lens element 340 is made of plastic material and has the object-side surface 341 and the image-side surface 342 being aspheric.

The fifth lens element 350 with positive refractive power has a convex object-side surface 351 and a concave image-side surface 352, wherein the object-side surface 351 of the fifth lens element 350 changes from convex at a paraxial region to concave at a peripheral region, and the image-side surface 352 of the fifth lens element 350 changes from concave at a paraxial region to convex at a peripheral region. The fifth lens element 350 is made of plastic material and has the object-side surface 351 and the image-side surface 352 being aspheric.

The sixth lens element 360 with positive refractive power has a convex object-side surface 361 and a concave image-side surface 362, wherein the image-side surface 362 of the sixth lens element 360 changes from concave at a paraxial region to convex at a peripheral region. The sixth lens element 360 is made of plastic material and has the object-side surface 361 and the image-side surface 362 being aspheric.

Moreover, when a central thickness of the first lens element 310 is CT1, a central thickness of the second lens element 320 is CT2, a central thickness of the third lens element 330 is CT3, a central thickness of the fourth lens element 340 is CT4, a central thickness of the fifth lens element 350 is CT5, and a central thickness of the sixth lens element 360 is CT6, CT6 is the thickest among CT1, CT2, CT3, CT4, CT5 and CT6.

The IR-cut filter 380 is made of glass, and located between the sixth lens element 360 and the image plane 370, and will not affect the focal length of the image lens assembly.

The detailed optical data of the 3rd embodiment are shown in Table 5 and the aspheric surface data are shown in Table 6 below.)

TABLE 5

3rd Embodiment
f = 3.62 mm, Fno = 2.40, HFOV = 38.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 2.586 | (ASP) | 0.365 | Plastic | 1.544 | 55.9 | 4.51 |
| 2 | | −45.977 | (ASP) | −0.040 | | | | |
| 3 | Ape. Stop | Plano | | 0.080 | | | | |
| 4 | Lens 2 | 4.148 | (ASP) | 0.303 | Plastic | 1.544 | 55.9 | −35.37 |
| 5 | | 3.324 | (ASP) | 0.207 | | | | |
| 6 | Lens 3 | 7.851 | (ASP) | 0.348 | Plastic | 1.535 | 56.3 | 5.73 |
| 7 | | −4.943 | (ASP) | 0.314 | | | | |
| 8 | Lens 4 | −0.787 | (ASP) | 0.250 | Plastic | 1.640 | 23.3 | −1.99 |
| 9 | | −2.317 | (ASP) | 0.030 | | | | |
| 10 | Lens 5 | 1.410 | (ASP) | 0.350 | Plastic | 1.535 | 56.3 | 3.82 |
| 11 | | 4.167 | (ASP) | 0.218 | | | | |
| 12 | Lens 6 | 1.625 | (ASP) | 1.050 | Plastic | 1.535 | 56.3 | 8.97 |
| 13 | | 1.904 | (ASP) | 0.492 | | | | |
| 14 | IR-cut filter | Plano | | 0.200 | Glass | 1.517 | 64.2 | — |
| 15 | | Plano | | 0.643 | | | | |
| 16 | Image | Plano | | — | | | | |

Note:
Reference wavelength (d-line) is 587.6 nm.

TABLE 6

Aspheric Coefficients

| | Surface # | | | | | |
|---|---|---|---|---|---|---|
| | 1 | 2 | 4 | 5 | 6 | 7 |
| k = | −1.0323E+00 | −2.0000E+01 | −2.0000E+01 | −1.8270E+01 | −1.0894E+01 | −1.8646E+01 |
| A4 = | −5.1096E−02 | −3.3042E−01 | −3.7740E−01 | −2.4737E−01 | −1.6056E−01 | −1.0636E−01 |
| A6 = | −4.4586E−02 | 7.5048E−01 | 8.5362E−01 | −5.4675E−02 | −2.3055E−01 | −2.1670E−01 |
| A8 = | −7.0362E−02 | −1.3477E+00 | −1.2941E+00 | 5.6936E−02 | −1.1685E−01 | 2.6695E−02 |
| A10 = | 4.4585E−02 | 1.3466E+00 | 1.1706E+00 | −3.4657E−01 | 3.0256E−01 | 1.3246E−01 |
| A12 = | −6.2180E−03 | −5.8225E−01 | −6.2362E−01 | 4.0398E−01 | −2.3452E−01 | −1.6319E−01 |
| A14 = | | | | −1.5853E−01 | 2.5399E−01 | 1.7455E−01 |

| | Surface # | | | | | |
|---|---|---|---|---|---|---|
| | 8 | 9 | 10 | 11 | 12 | 13 |
| k = | −3.2926E+00 | 1.2859E+00 | −9.8794E+00 | 3.0000E+00 | −1.1073E+01 | −2.9426E+00 |
| A4 = | −4.1454E−01 | −4.0061E−01 | 7.8826E−02 | 1.7557E−01 | −1.9002E−01 | −1.8222E−01 |
| A6 = | 4.5210E−02 | 3.5489E−01 | −1.9025E−01 | −3.8131E−01 | 3.5324E−02 | 9.7623E−02 |
| A8 = | 5.5256E−01 | −2.0691E−02 | 9.2275E−02 | 3.0878E−01 | 1.8523E−02 | −4.2574E−02 |
| A10 = | −6.1839E−01 | −6.3656E−02 | −3.0406E−02 | −1.7157E−01 | −1.0336E−02 | 1.2934E−02 |
| A12 = | 5.0984E−01 | 9.2322E−02 | −9.2850E−04 | 6.0698E−02 | 2.2036E−03 | −2.4524E−03 |
| A14 = | −1.8028E−01 | −3.4216E−02 | 2.3757E−03 | −1.1501E−02 | −2.3069E−04 | 2.5592E−04 |
| A16 = | | | | 8.6055E−04 | 9.7129E−06 | −1.1161E−05 |

In the optical image system according to the 3rd embodiment, the definitions of f, Fno, HFOV, V4, V5, R5, R6, R12, f1, f2, f4, f5 and f6 are the same as those stated in the 1st embodiment with corresponding values for the 3rd embodiment. Moreover, these parameters can be calculated from Table 5 and Table 6 as the following values and satisfy the following relationships:

| f (mm) | 3.62 | f1/f2 | −0.13 |
|---|---|---|---|
| Fno | 2.40 | f/f4 | −1.82 |
| HFOV (deg.) | 38.1 | f5/f6 | 0.43 |
| V4/V5 | 0.41 | (f/f5) + (f/f6) | 1.35 |
| |R6/R5| | 0.63 | f/f6 | 0.40 |
| R12/f | 0.53 | | |

Moreover, in the image lens assembly according to the 3rd embodiment, when the lens elements (310, 330, 350 and 360) have positive refractive power, the following relationship is satisfied:

$$0 < f/fi < 1.0, i = 1, 3, 5 \text{ or } 6.$$

4th Embodiment

Figure 7:
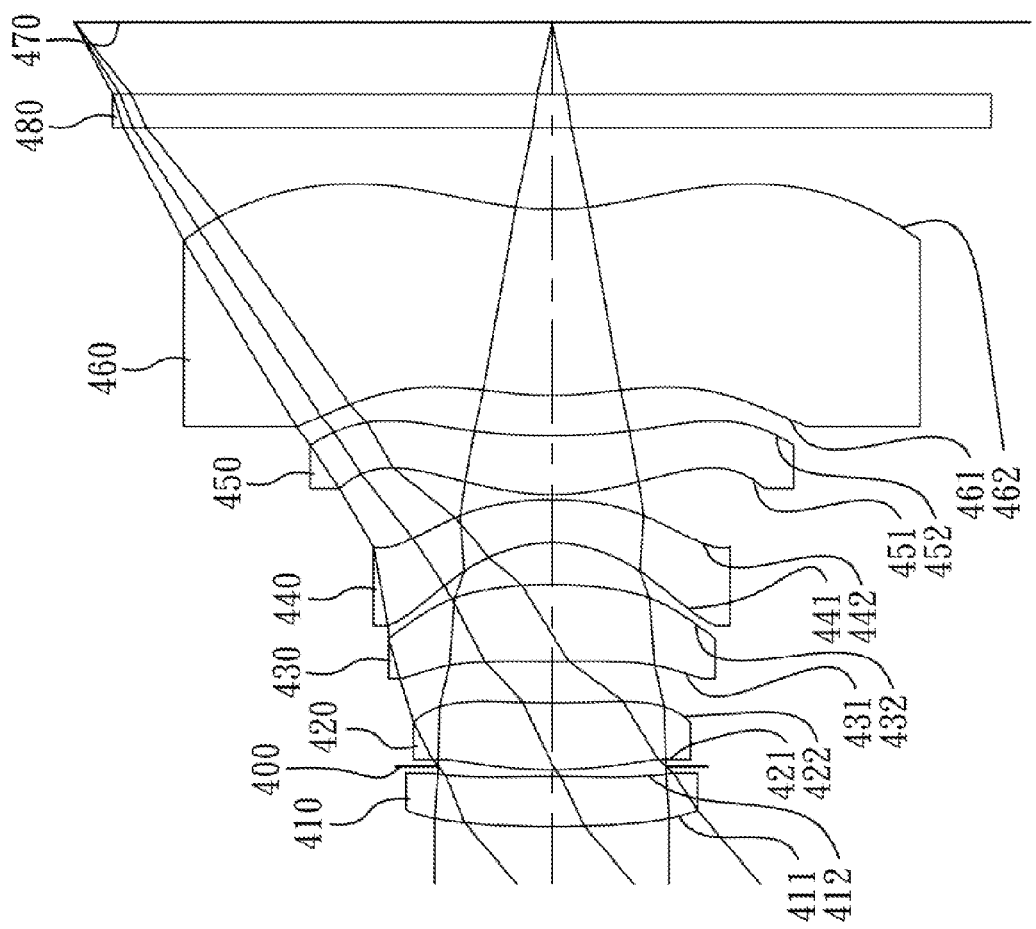
FIG. 7 is a schematic view of an image lens assembly according to the 4th embodiment of the present disclosure.
Figure 8:
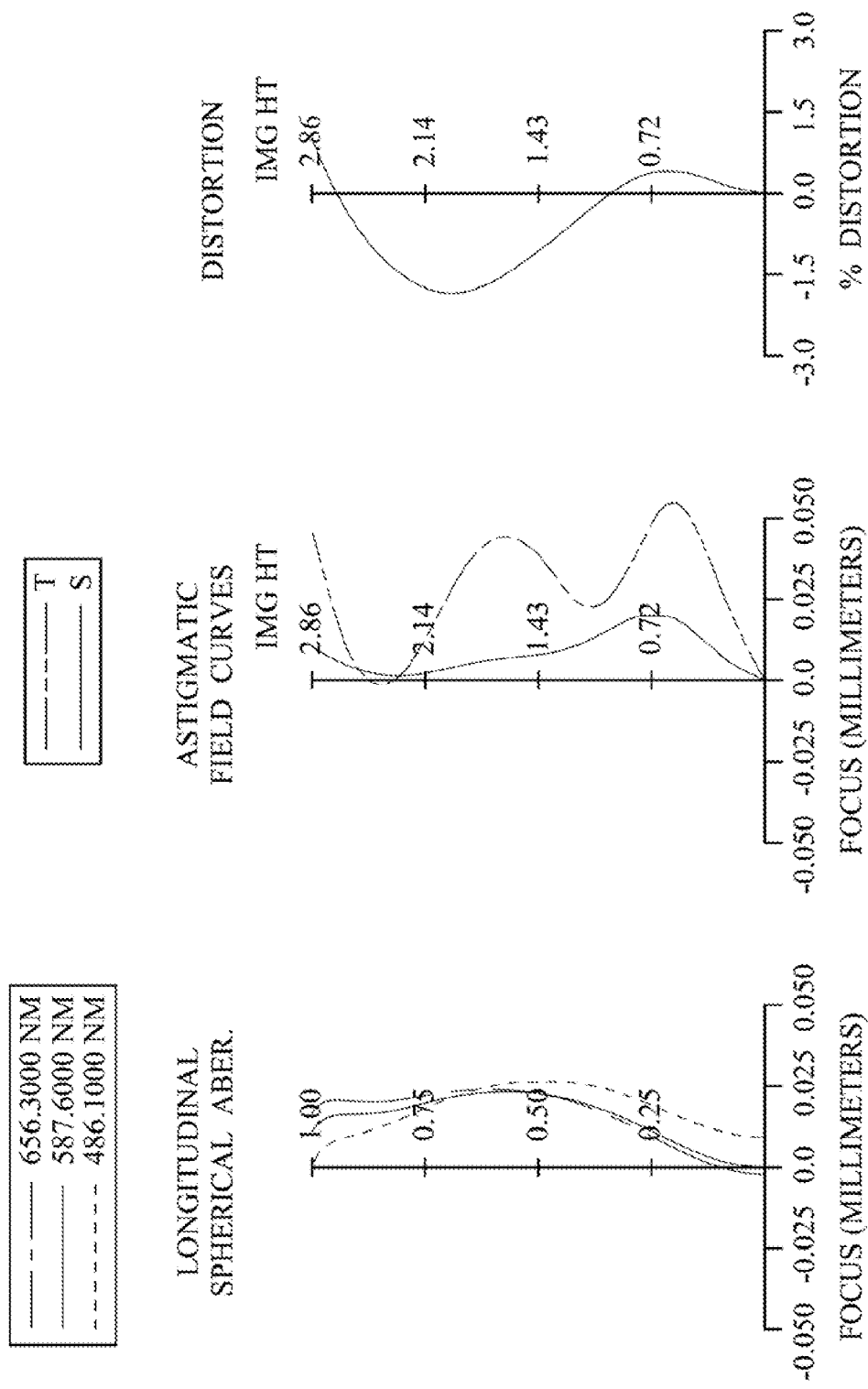
FIG. 8 shows spherical aberration curves, astigmatic field curves and a distortion curve of the image lens assembly according to the 4th embodiment.

FIG. 7 is a schematic view of an image lens assembly according to the 4th embodiment of the present disclosure. FIG. 8 shows spherical aberration curves, astigmatic field curves and a distortion curve of the image lens assembly according to the 4th embodiment. In FIG. 7, the image lens assembly includes, in order from an object side to an image side, a first lens element 410, an aperture stop 400, a second lens element 420, a third lens element 430, a fourth lens element 440, a fifth lens element 450, a sixth lens element 460, an IR-cut filter 480 and an image plane 470.

The first lens element 410 with positive refractive power has a convex object-side surface 411 and a convex image-side surface 412. The first lens 2o element 410 is made of plastic material and has the object-side surface 411 and the image-side surface 412 being aspheric.

The second lens element 420 with positive refractive power has a convex object-side surface 421 and a concave image-side surface 422. The second lens element 420 is made of plastic material and has the object-side surface 421 and the image-side surface 422 being aspheric.

The third lens element 430 with positive refractive power has a convex object-side surface 431 and a convex image-side surface 432. The third lens element 430 is made of plastic material and has the object-side surface 431 and the image-side surface 432 being aspheric.

The fourth lens element 440 with negative refractive power has a concave object-side surface 441 and a convex image-side surface 442. The fourth lens element 440 is made of plastic material and has the object-side surface 441 and the image-side surface 442 being aspheric.

The fifth lens element 450 with positive refractive power has a convex object-side surface 451 and a concave image-side surface 452, wherein the object-side surface 451 of the fifth lens element 450 changes from convex at a paraxial region to concave at a peripheral region, and the image-side surface 452 of the fifth lens element 450 changes from concave at a paraxial region to convex at a peripheral region. The fifth lens element 450 is made of plastic material and has the object-side surface 451 and the image-side surface 452 being aspheric.

The sixth lens element 460 with positive refractive power has a convex object-side surface 461 and a concave image-side surface 462, wherein the image-side surface 462 of the sixth lens element 460 changes from concave at a paraxial region to convex at a peripheral region. The sixth lens element 460 is made of plastic material and has the object-side surface 461 and the image-side surface 462 being aspheric.

Moreover, when a central thickness of the first lens element 410 is CT1, a central thickness of the second lens element 420 is CT2, a central thickness of the third lens element 430 is CT3, a central thickness of the fourth lens element 440 is CT4, a central thickness of the fifth lens element 450 is CT5, and a central thickness of the sixth lens element 460 is CT6, CT6 is the thickest among CT1, CT2, CT3, CT4, CT5 and CT6.

The IR-cut filter 480 is made of glass, and located between the sixth lens element 460 and the image plane 470, and will not affect the focal length of the image lens assembly.

The detailed optical data of the 4th embodiment are shown in Table 7 and the aspheric surface data are shown in Table 8 below.

TABLE 7

4th Embodiment
f = 3.36 mm, Fno = 2.40, HFOV = 40.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 7.307 | (ASP) | 0.298 | Plastic | 1.544 | 55.9 | 10.31 |
| 2 | | −23.788 | (ASP) | 0.061 | | | | |
| 3 | Ape. Stop | Plano | | −0.021 | | | | |
| 4 | Lens 2 | 2.456 | (ASP) | 0.400 | Plastic | 1.544 | 55.9 | 8.84 |
| 5 | | 4.733 | (ASP) | 0.245 | | | | |
| 6 | Lens 3 | 32.143 | (ASP) | 0.462 | Plastic | 1.544 | 55.9 | 4.97 |
| 7 | | −2.938 | (ASP) | 0.248 | | | | |
| 8 | Lens 4 | −0.793 | (ASP) | 0.260 | Plastic | 1.640 | 23.3 | −2.16 |
| 9 | | −2.097 | (ASP) | 0.030 | | | | |
| 10 | Lens 5 | 1.405 | (ASP) | 0.350 | Plastic | 1.535 | 56.3 | 3.57 |
| 11 | | 4.874 | (ASP) | 0.243 | | | | |
| 12 | Lens 6 | 2.008 | (ASP) | 1.110 | Plastic | 1.535 | 56.3 | 59.94 |
| 13 | | 1.730 | (ASP) | 0.492 | | | | |
| 14 | IR-cut filter | Plano | | 0.200 | Glass | 1.517 | 64.2 | — |
| 15 | | Plano | | 0.426 | | | | |
| 16 | Image | Plano | | — | | | | |

Note:
Reference wavelength (d-line) is 587.6 nm.

TABLE 8

Aspheric Coefficients

| | Surface # | | | | | |
|---|---|---|---|---|---|---|
| | 1 | 2 | 4 | 5 | 6 | 7 |
| k = | 2.6063E+01 | −1.0000E+00 | −1.6311E+00 | −4.3697E+01 | 9.9292E−01 | −1.1636E+00 |
| A4 = | 1.4507E−02 | −1.0862E−02 | −1.7432E−01 | −2.5314E−01 | −1.6833E−01 | −1.5193E−01 |
| A6 = | 8.4809E−02 | 6.2309E−01 | 5.7744E−01 | −7.9586E−02 | −8.0668E−02 | −1.3498E−01 |
| A8 = | −4.7091E−02 | −1.4819E+00 | −1.8690E+00 | −1.3546E−01 | −1.6176E−01 | −4.9640E−02 |
| A10 = | 4.1835E−02 | 2.1526E+00 | 2.6862E+00 | −7.0004E−02 | 2.0282E−01 | 2.3882E−01 |
| A12 = | −1.2355E−02 | −1.3830E+00 | −2.1822E+00 | 3.5345E−01 | 3.5138E−01 | −6.5240E−02 |
| A14 = | | | | −3.4009E−01 | −2.6687E−01 | −6.1906E−03 |

| | Surface # | | | | | |
|---|---|---|---|---|---|---|
| | 8 | 9 | 10 | 11 | 12 | 13 |
| k = | −3.3213E+00 | 1.4998E+00 | −1.0931E+01 | 3.0000E+00 | −1.5756E+01 | −2.4507E+00 |
| A4 = | −4.1936E−01 | −3.4465E−01 | 7.8826E−02 | 1.7557E−01 | −1.9002E−01 | −1.8222E−01 |
| A6 = | 8.7396E−02 | 3.7891E−01 | −1.9025E−01 | −3.8131E−01 | 3.5324E−02 | 9.7623E−02 |
| A8 = | 5.9282E−01 | 1.8037E−02 | 9.2275E−02 | 3.0878E−01 | 1.8523E−02 | −4.2574E−02 |
| A10 = | −6.5224E−01 | −1.2340E−01 | −3.0406E−02 | −1.7157E−01 | −1.0336E−02 | 1.2934E−02 |
| A12 = | 4.2538E−01 | 7.6192E−02 | −9.2850E−04 | 6.0698E−02 | 2.2036E−03 | −2.4524E−03 |
| A14 = | −1.3594E−01 | −6.5596E−03 | 2.3757E−03 | −1.1501E−02 | −2.3069E−04 | 2.5592E−04 |
| A16 = | | | | 8.6055E−04 | 9.7129E−06 | −1.1161E−05 |

In the optical image system according to the 4th embodiment, the definitions of f, Fno, HFOV V4, V5, R5, R6, R12, f1, f2, f4, f5 and f6 are the same as those stated in the 1st embodiment with corresponding values for the 4th embodiment. Moreover, these parameters can be calculated from Table 7 and Table 8 as the following values and satisfy the following relationships:

| f (mm) | 3.36 | f1/f2 | 1.17 |
|---|---|---|---|
| Fno | 2.40 | f/f4 | −1.56 |
| HFOV (deg.) | 40.0 | f5/f6 | 0.06 |
| V4/V5 | 0.41 | (f/f5) + (f/f6) | 1.00 |
| |R6/R5| | 0.09 | f/f6 | 0.06 |
| R12/f | 0.51 | | |

Moreover, in the image lens assembly according to the 4th embodiment, when the lens elements (410-430, 450 and 460) have positive refractive power, the following relationship is satisfied:

$$0 < f/fi < 1.0, i = 1,2,3,5 \text{ or } 6.$$

5th Embodiment

Figure 9:
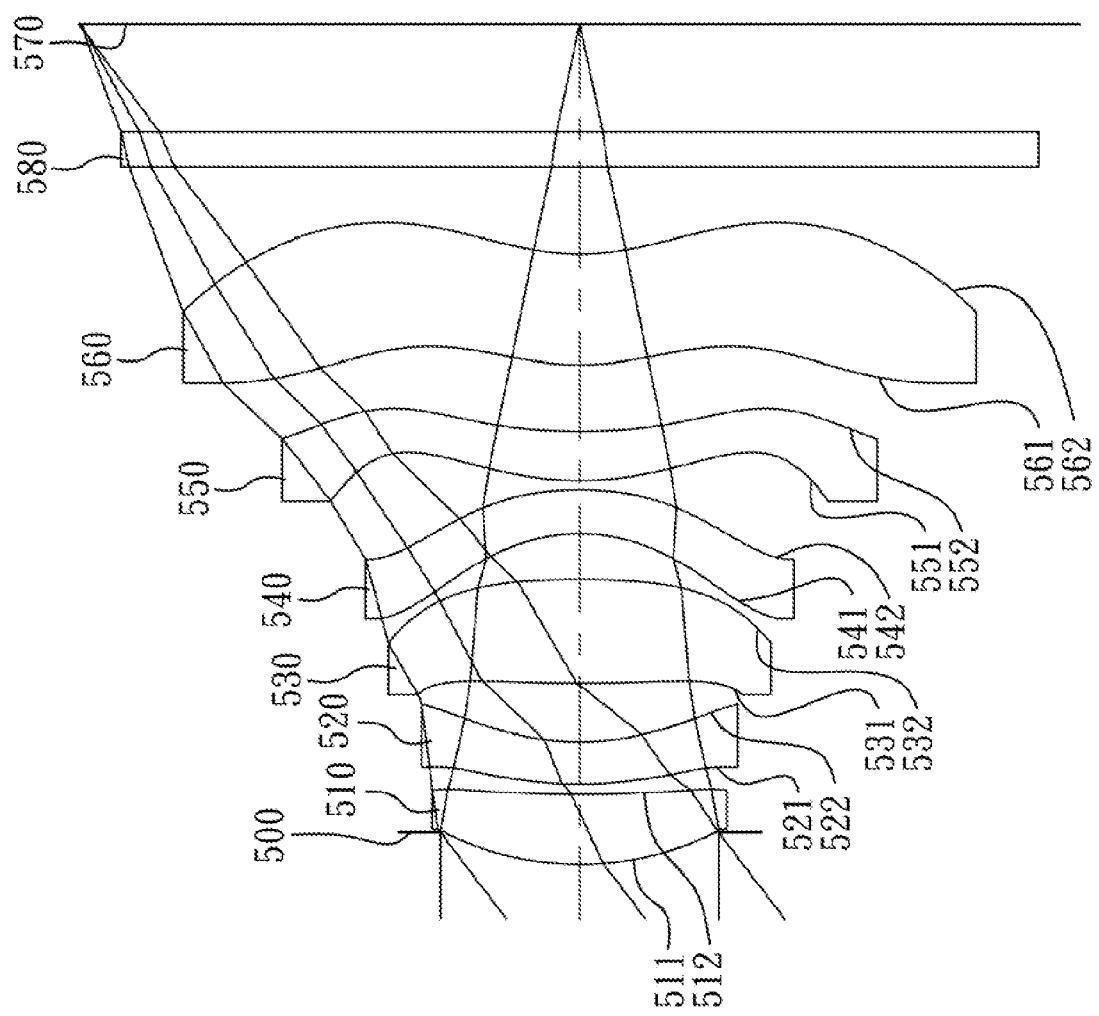
FIG. 9 is a schematic view of an image lens assembly according to the 5th embodiment of the present disclosure.
Figure 10:
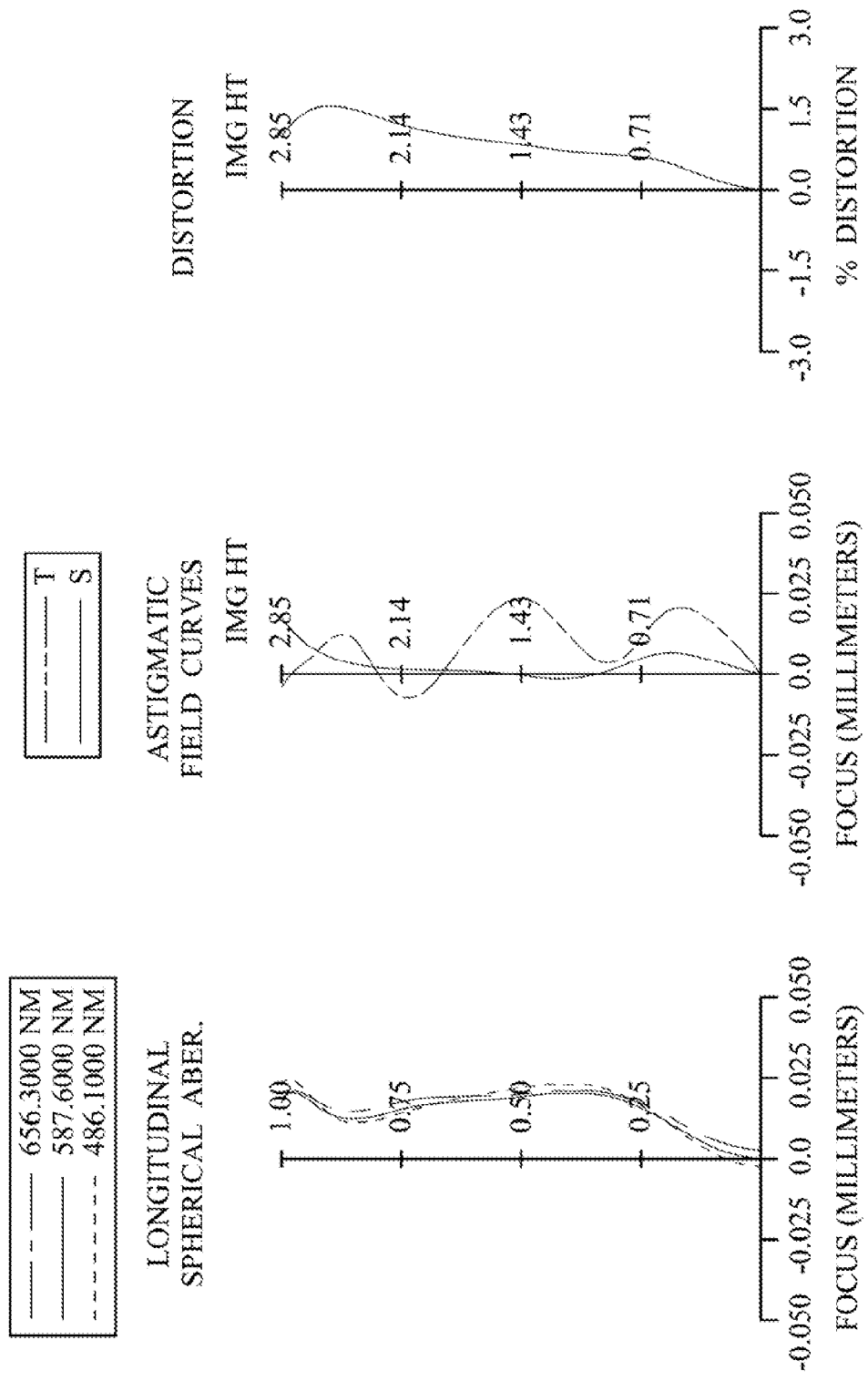
FIG. 10 shows spherical aberration curves, astigmatic field curves and a distortion curve of the image lens assembly according to the 5th embodiment.

FIG. 9 is a schematic view of an image lens assembly according to the 5th embodiment of the present disclosure FIG. 10 shows spherical aberration curves, astigmatic field curves and a distortion curve of the image lens assembly according to the 5th embodiment. In FIG. 9, the image lens assembly includes, in order from an object side to an image side, an aperture stop 500, a first lens element 510, a second lens element 520, a third lens element 530, a fourth lens element 540, a fifth lens element 550, a sixth lens element 560, an IR-cut filter 580 and an image plane 570.

The first lens element 510 with positive refractive power has a convex object-side surface 511 and a concave image-side surface 512. The first lens element 510 is made of plastic material and has the object-side surface 511 and the image-side surface 512 being aspheric.

The second lens element 520 with negative refractive power has a convex object-side surface 521 and a concave image-side surface 522. The second lens element 520 is made of plastic material and has the object-side surface 521 and the image-side surface 522 being aspheric.

The third lens element 530 with positive refractive power has a convex object-side surface 531 and a convex image-side surface 532. The third lens element 530 is made of plastic material and has the object-side surface 531 and the image-side surface 532 being aspheric.

The fourth lens element 540 with negative refractive power has a concave object-side surface 541 and a convex image-side surface 542. The fourth lens element 540 is made of plastic material and has the object-side surface 541 and the image-side surface 542 being aspheric.

The fifth lens element 550 with positive refractive power has convex object-side surface 551 and a concave image-side surface 552, wherein the object-side surface 551 of the fifth lens element 550 changes from convex at a paraxial region to concave at a peripheral region, and the image-side surface 552 of the fifth lens element 550 changes from concave at a paraxial region to convex at a peripheral region. The fifth lens element 550 is made of plastic material and has the object-side surface 551 and the image-side surface 552 being aspheric.

The sixth lens element 560 with positive refractive power has a convex object-side surface 561 and a concave image-side surface 562, wherein the image-side surface 562 of the sixth lens element 560 changes from concave at a paraxial region to convex at a peripheral region. The sixth lens element 560 is made of plastic material and has the object-side surface 561 and the image-side surface 562 being aspheric.

Moreover, when a central thickness of the first lens element 510 is CT1, a central thickness of the second lens element 520 is CT2, a central thickness of the third lens element 530 is CT3, a central thickness of the fourth lens element 540 is CT4, a central thickness of the fifth lens element 550 is CT5, and a central thickness of the sixth lens element 560 is CT6, CT6 is the thickest among CT1, CT2, CT3, CT4, CT5 and CT6.

The IR-cut filter 580 is made of glass, and located between the sixth lens element 560 and the image plane 570, and will not affect the focal length of the image lens assembly.

The detailed optical data of the 5th embodiment are shown in Table 9 and the aspheric surface data are shown in Table 10 below.

TABLE 9

5th Embodiment
f = 3.74 mm, Fno = 2.35, HFOV = 37.0 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.183 | | | | |
| 2 | Lens 1 | 1.775 | (ASP) | 0.402 | Plastic | 1.544 | 55.9 | 4.32 |
| 3 | | 6.686 | (ASP) | 0.057 | | | | |
| 4 | Lens 2 | 1.912 | (ASP) | 0.240 | Plastic | 1.640 | 23.3 | −9.61 |
| 5 | | 1.387 | (ASP) | 0.337 | | | | |
| 6 | Lens 3 | 7.280 | (ASP) | 0.591 | Plastic | 1.544 | 55.9 | 5.98 |
| 7 | | −5.714 | (ASP) | 0.265 | | | | |
| 8 | Lens 4 | −1.030 | (ASP) | 0.250 | Plastic | 1.640 | 23.3 | −4.07 |
| 9 | | −1.867 | (ASP) | 0.050 | | | | |
| 10 | Lens 5 | 1.792 | (ASP) | 0.285 | Plastic | 1.544 | 55.9 | 6.05 |
| 11 | | 3.710 | (ASP) | 0.379 | | | | |
| 12 | Lens 6 | 1.434 | (ASP) | 0.635 | Plastic | 1.544 | 55.9 | 38.97 |
| 13 | | 1.298 | (ASP) | 0.500 | | | | |
| 14 | IR-cut filter | Plano | | 0.200 | Glass | 1.517 | 64.2 | — |
| 15 | | Plano | | 0.614 | | | | |
| 16 | Image | Plano | | — | | | | |

Note:
Reference wavelength (d-line) is 587.6 nm.

TABLE 10

Aspheric Coefficients

| | Surface # | | | | | |
|---|---|---|---|---|---|---|
| | 2 | 3 | 4 | 5 | 6 | 7 |
| k = | −2.0560E+00 | −9.3839E+00 | 7.1178E−01 | −3.4571E+00 | −1.0000E+01 | 3.0000E+00 |
| A4 = | 5.2314E−02 | −2.7371E−01 | −4.9787E−01 | −1.5581E−01 | −1.1489E−01 | −1.6250E−01 |
| A6 = | 4.9093E−02 | 1.2043E+00 | 1.4370E+00 | 4.4514E−01 | 8.9338E−02 | −1.6872E−02 |
| A8 = | −9.3402E−02 | −2.3146E+00 | −2.4842E+00 | −1.8100E−01 | −1.6003E−01 | 7.6360E−02 |
| A10 = | 1.8458E−01 | 2.1058E+00 | 1.9384E+00 | −9.8814E−01 | 3.1110E−02 | −9.4423E−02 |
| A12 = | −1.8044E−01 | −9.0020E−01 | −6.7797E−01 | 1.4203E+00 | 1.7829E−01 | 3.6027E−02 |
| A14 = | | | | −6.1019E−01 | −2.8133E−01 | −7.0379E−03 |

TABLE 10-continued

Aspheric Coefficients

| Surface # | | | | | |
|---|---|---|---|---|---|
| 8 | 9 | 10 | 11 | 12 | 13 |
| k = −1.5567E+00 | 5.4269E−02 | −6.7392E+00 | 3.0000E+00 | −6.3395E+00 | 4.0317E+00 |
| A4 = −1.5742E−01 | −2.9179E−01 | 7.8826E−02 | 1.7557E−01 | −1.9002E−01 | −1.8222E−01 |
| A6 = −1.0492E−02 | 3.7730E−01 | −1.9025E−01 | −3.8131E−01 | 3.5324E−02 | 9.7623E−02 |
| A8 = 5.5121E−01 | −2.0731E−01 | 9.2275E−02 | 3.0878E−01 | 1.8523E−02 | −4.2574E−02 |
| A10 = −7.6687E−01 | 1.0551E−01 | −3.0406E−02 | −1.7157E−01 | −1.0336E−02 | 1.2934E−02 |
| A12 = 5.1813E−01 | −3.6814E−02 | −9.2850E−04 | 6.0698E−02 | 2.2036E−03 | −2.4524E−03 |
| A14 = −1.3986E−01 | 6.8251E−03 | 2.3757E−03 | −1.1501E−02 | −2.3069E−04 | 2.5592E−04 |
| A16 = | | | 8.6055E−04 | 9.7129E−06 | −1.1161E−05 |

In the optical image system according to the 5th embodiment, the definitions of f, Fno, HFOV, V4, V5, R5, R6, R12, f1, f2, f4, f5 and f6 are the same as those stated in the 1st embodiment with corresponding values for the 5th embodiment. Moreover, these parameters can be calculated from Table 9 and Table 10 as the following values and satisfy the following relationships:

| f (mm) | 3.74 | f1/f2 | −0.45 |
|---|---|---|---|
| Fno | 2.35 | f/f4 | −0.92 |
| HFOV (deg.) | 37.0 | f5/f6 | 0.16 |
| V4/V5 | 0.42 | (f/f5) + (f/f6) | 0.71 |
| |R6/R5| | 0.78 | f/f6 | 0.10 |
| R12/f | 0.35 | | |

Moreover, in the image lens assembly according to the 5th embodiment, when the lens elements (510, 530, 550 and 560) have positive refractive power, the following relationship is satisfied:

$0 < f/fi < 1.0, i=1,3,5$ or $6$.

6th Embodiment

Figure 11:
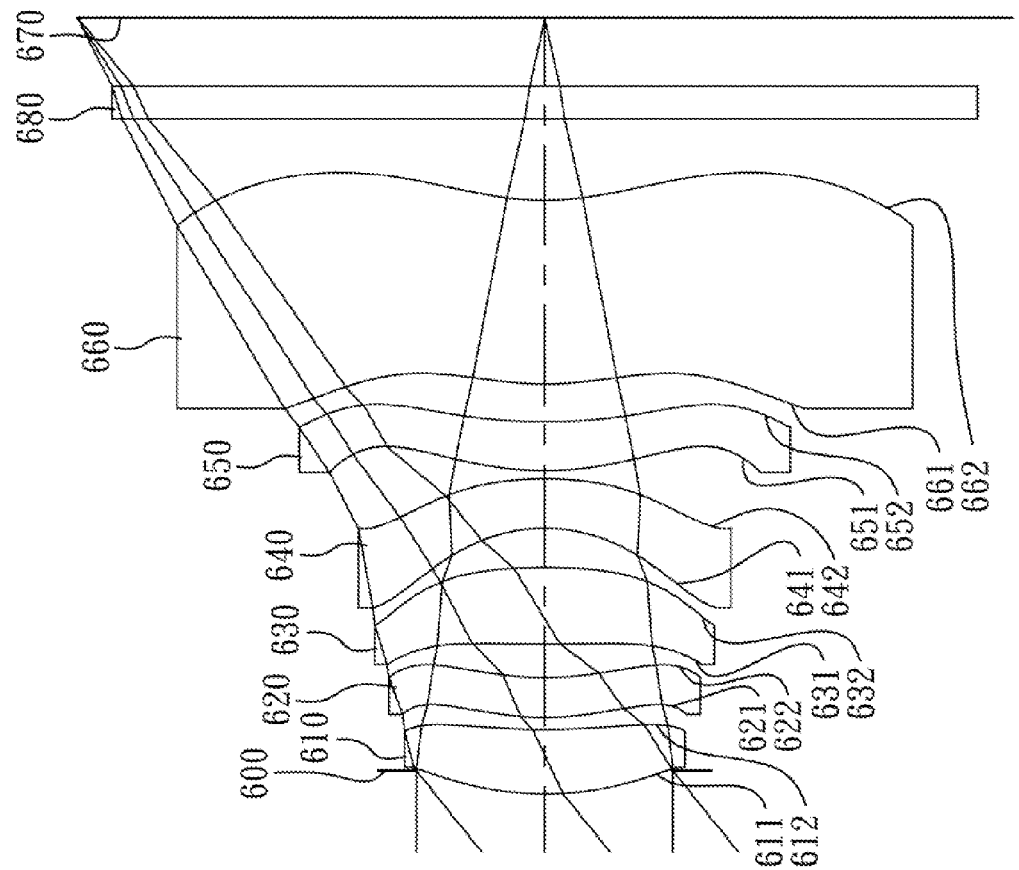
FIG. 11 is a schematic view of an image lens assembly according to the 6th embodiment of the present disclosure.
Figure 12:
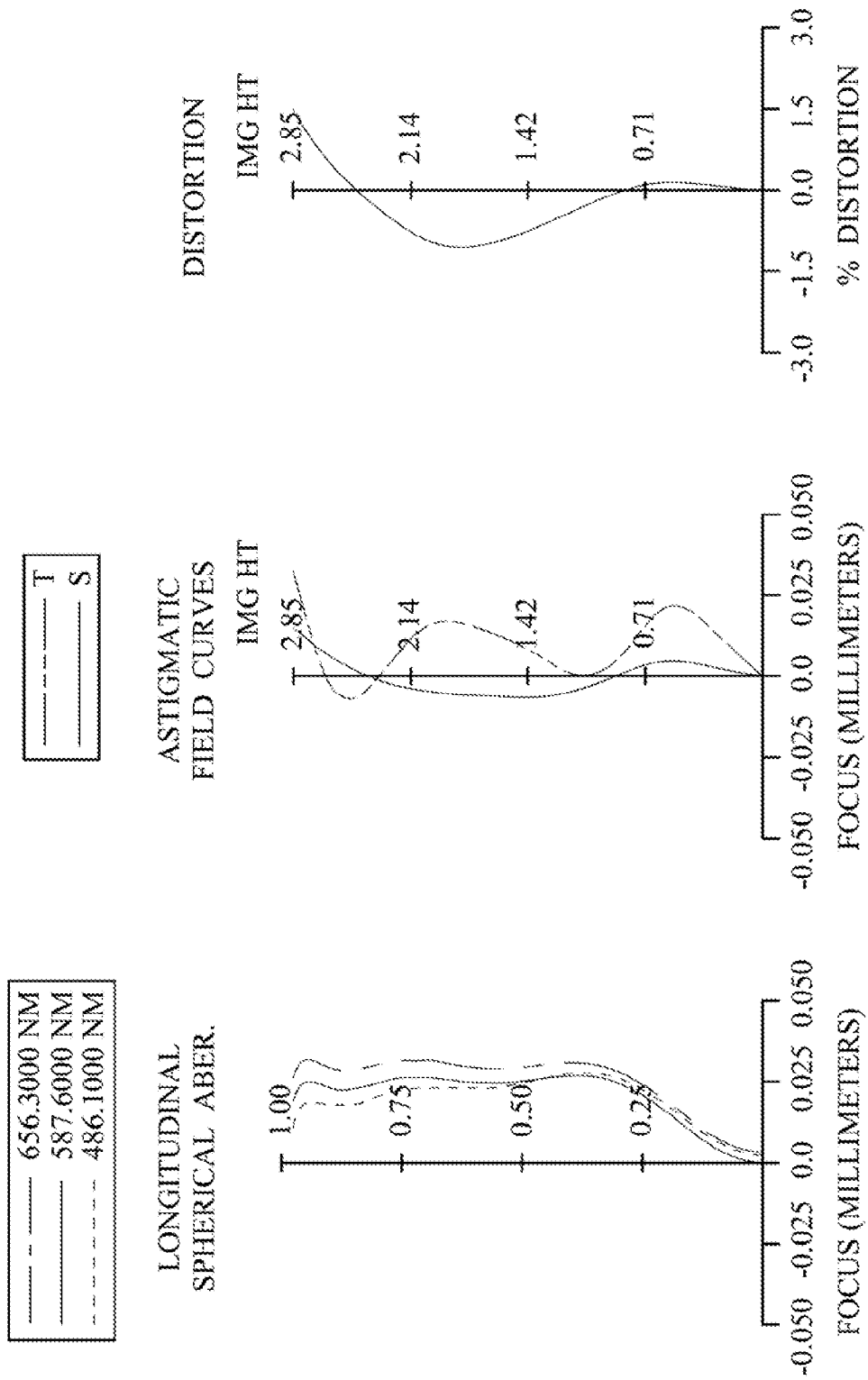
FIG. 12 shows spherical aberration curves, astigmatic field curves and a distortion curve of the image lens assembly according to the 6th embodiment.

FIG. 11 is a schematic view of an image lens assembly according to the 6th embodiment of the present disclosure. FIG. 12 shows spherical aberration curves, astigmatic field curves and a distortion curve of the image lens assembly according to the 6th embodiment. In FIG. 11, the image lens assembly includes, in order from an object side to an image side, an aperture stop 600, a first lens element 610, a second lens element 620, a third lens element 630, a fourth lens element 640, a fifth lens element 650, a sixth lens element 660, an IR-cut filter 680 and an image plane 670.

The first lens element 610 with positive refractive power has a convex object-side surface 611 and a concave image-side surface 612. The first lens element 610 is made of plastic material and has the object-side surface 611 and the image-side surface 612 being aspheric.

The second lens element 620 with positive refractive power has a convex object-side surface 621 and a concave image-side surface 622. The second lens element 620 is made of plastic material and has the object-side surface 621 and the image-side surface 622 being aspheric.

The third lens element 630 with positive refractive power has a convex object-side surface 631 and a convex image-side surface 632. The third lens element 630 is made of plastic material and has the object-side surface 631 and the image-side surface 632 being aspheric.

The fourth lens element 640 with negative refractive power has a concave object-side surface 641 and a convex image-side surface 642. The fourth lens element 640 is made of plastic material and has the object-side surface 641 and the image-side surface 642 being aspheric.

The fifth lens element 650 with positive refractive power has a convex object-side surface 651 and a concave image-side surface 652, wherein the object-side surface 651 of the fifth lens element 650 changes from convex at a paraxial region to concave at a peripheral region, and the image-side surface 652 of the fifth lens element 650 changes from concave at a paraxial region to convex at a peripheral region. The fifth lens element 650 is made of plastic material and has the object-side surface 651 and the image-side surface 652 being aspheric.

The sixth lens element 660 with positive refractive power has a convex object-side surface 661 and a concave image-side surface 662, wherein the image-side surface 662 of the sixth lens element 660 changes from concave at a paraxial region to convex at a peripheral region. The sixth lens element 660 is made of plastic material and has the object-side surface 661 and the image-side surface 662 being aspheric.

Moreover, when a central thickness of the first lens element 610 is CT1, a central thickness of the second lens element 620 is CT2, a central thickness of the third lens element 630 is CT3, a central thickness of the fourth lens element 640 is CT4, a central thickness of the fifth lens element 650 is CT5, and a central thickness of the sixth lens element 660 is CT6, CT6 is the thickest among CT1, CT2, CT3, CT4, CT5 and CT6.

The IR-cut filter 680 is made of glass, and located between the sixth lens element 660 and the image plane 670, and will not affect the focal length of the image lens assembly.

The detailed optical data of the 6th embodiment are shown in Table 11 and the aspheric surface data are shown in Table 12 below.

TABLE 11

6th Embodiment
f = 3.52 mm, Fno = 2.25, HFOV = 38.5 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Ape. Stop | Plano | | −0.142 | | | | |
| 2 | Lens 1 | 1.932 | (ASP) | 0.392 | Plastic | 1.535 | 56.3 | 8.26 |
| 3 | | 3.191 | (ASP) | 0.073 | | | | |

TABLE 11-continued

6th Embodiment
f = 3.52 mm, Fno = 2.25, HFOV = 38.5 deg.

| Surface # | | Curvature Radius | | Thickness | Material | Index | Abbe # | Focal length |
|---|---|---|---|---|---|---|---|---|
| 4 | Lens 2 | 1.514 | (ASP) | 0.240 | Plastic | 1.535 | 56.3 | 15.69 |
| 5 | | 1.746 | (ASP) | 0.205 | | | | |
| 6 | Lens 3 | 9.733 | (ASP) | 0.470 | Plastic | 1.544 | 55.9 | 4.93 |
| 7 | | −3.637 | (ASP) | 0.236 | | | | |
| 8 | Lens 4 | −1.016 | (ASP) | 0.305 | Plastic | 1.650 | 21.4 | −3.08 |
| 9 | | −2.311 | (ASP) | 0.050 | | | | |
| 10 | Lens 5 | 1.970 | (ASP) | 0.295 | Plastic | 1.544 | 55.9 | 6.48 |
| 11 | | 4.229 | (ASP) | 0.233 | | | | |
| 12 | Lens 6 | 1.868 | (ASP) | 1.117 | Plastic | 1.535 | 56.3 | 30.16 |
| 13 | | 1.673 | (ASP) | 0.500 | | | | |
| 14 | IR-cut filter | Plano | | 0.200 | Glass | 1.517 | 64.2 | — |
| 15 | | Plano | | 0.413 | | | | |
| 16 | Image | Plano | | — | | | | |

Note:
Reference wavelength (d-line) is 587.6 nm.

TABLE 12

Aspheric Coefficients

| | Surface # | | | | | |
|---|---|---|---|---|---|---|
| | 2 | 3 | 4 | 5 | 6 | 7 |
| k = | −6.7166E+00 | −1.0000E+01 | −1.2570E+00 | −2.8208E+00 | −1.0000E+01 | 7.1392E−01 |
| A4 = | 8.1530E−02 | −3.8605E−01 | −5.9697E−01 | −2.9181E−01 | −1.6931E−01 | −1.8959E−01 |
| A6 = | 1.0565E−01 | 1.1596E+00 | 1.3367E+00 | 2.8249E−01 | −5.6885E−02 | −8.6594E−02 |
| A8 = | −4.5296E−01 | −2.2921E+00 | −2.3606E+00 | −3.6822E−02 | 1.0048E−01 | 8.3035E−02 |
| A10 = | 6.7163E−01 | 2.1674E+00 | 1.9796E+00 | −8.2935E−01 | −2.9555E−02 | −4.5434E−02 |
| A12 = | −4.6070E−01 | −1.0101E+00 | −9.8687E−01 | 7.7121E−01 | −2.5733E−01 | 4.3156E−02 |
| A14 = | | | | −2.0120E−01 | 2.1533E−01 | 5.9456E−03 |

| | Surface # | | | | | |
|---|---|---|---|---|---|---|
| | 8 | 9 | 10 | 11 | 12 | 13 |
| k = | −1.2981E+00 | 2.3128E−01 | −7.6867E+00 | 3.0000E+00 | −1.0000E+01 | −2.1901E+00 |
| A4 = | −1.4550E−01 | −3.0560E−01 | 7.8826E−02 | 1.7557E−01 | −1.9002E−01 | −1.8222E−01 |
| A6 = | −9.1001E−03 | 3.8190E−01 | −1.9025E−01 | −3.8131E−01 | 3.5324E−02 | 9.7623E−02 |
| A8 = | 4.7752E−01 | −2.0567E−01 | 9.2275E−02 | 3.0878E−01 | 1.8523E−02 | −4.2574E−02 |
| A10 = | −7.6817E−01 | 9.9605E−02 | −3.0406E−02 | −1.7157E−01 | −1.0336E−02 | 1.2934E−02 |
| A12 = | 6.3246E−01 | −4.4202E−02 | −9.2850E−04 | 6.0698E−02 | 2.2036E−03 | −2.4524E−03 |
| A14 = | −1.9163E−01 | 1.7793E−02 | 2.3757E−03 | −1.1501E−02 | −2.3069E−04 | 2.5592E−04 |
| A16 = | | | | 8.6055E−04 | 9.7129E−06 | −1.1161E−05 |

In the optical image system according to the 6th embodiment, the definitions of f, Fno, HFOV, V4, V5, R5, R6, R12, f1, f2, f4, f5 and f6 are the same as those stated in the 1st embodiment with corresponding values for the 6th embodiment. Moreover, these parameters can be calculated from Table 11 and Table 12 as the following values and satisfy the following relationships:

| f (mm) | 3.52 | f1/f2 | 0.53 |
|---|---|---|---|
| Fno | 2.25 | f/f4 | −1.14 |
| HFOV (deg.) | 38.5 | f5/f6 | 0.21 |
| V4/V5 | 0.38 | (f/f5) + (f/f6) | 0.66 |
| |R6/R5| | 0.37 | f/f6 | 0.12 |
| R12/f | 0.48 | | |

Moreover, in the image lens assembly according to the 6th embodiment, when the lens elements (610-630, 650 and 660) have positive refractive power, the following relationship is satisfied:

$0 < f/fi < 1.0, i = 1, 2, 3, 5$ or $6$.

7th Embodiment

Figure 13:
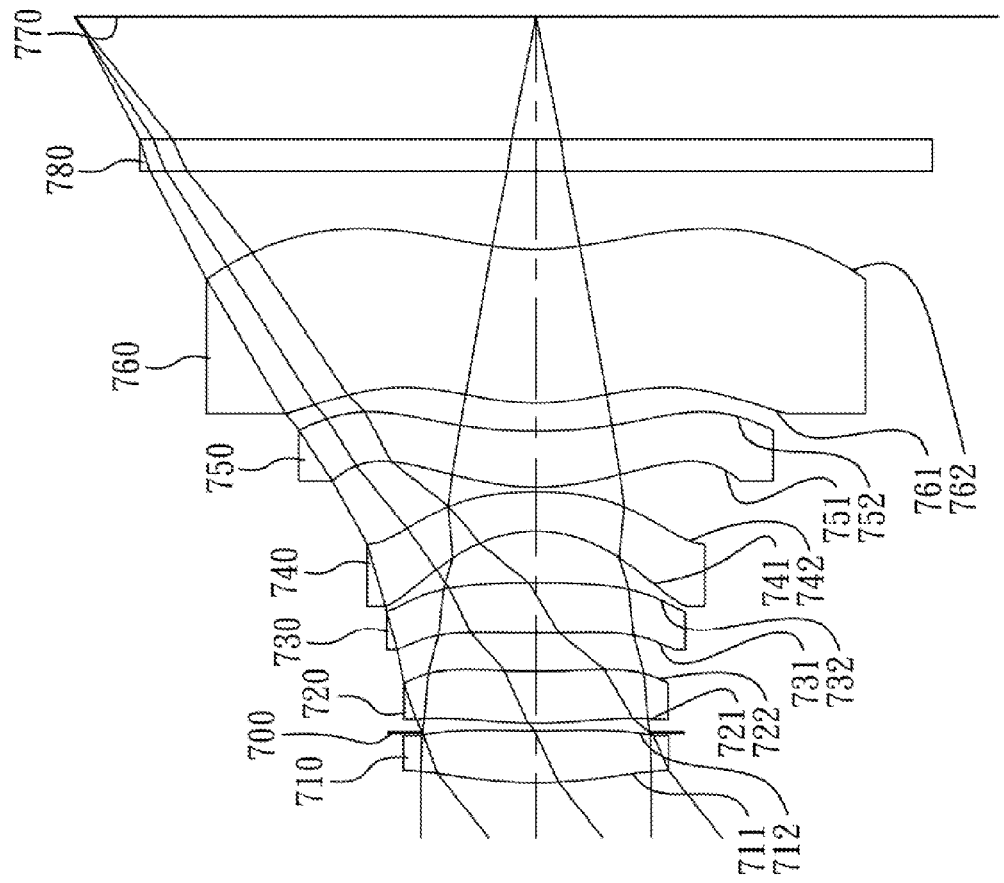
FIG. 13 is a schematic view of an image lens assembly according to the 7th embodiment of the present disclosure.
Figure 14:
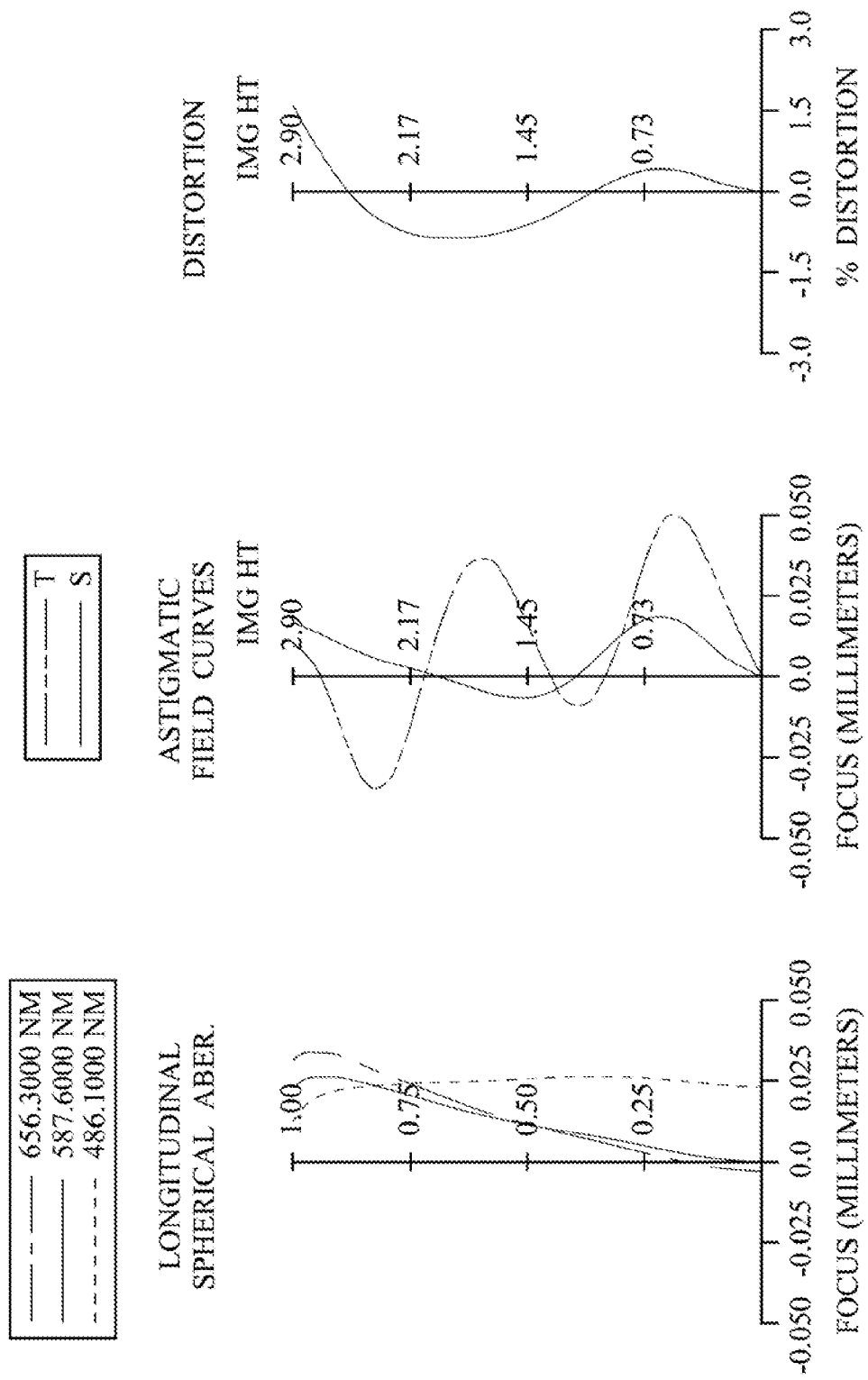
FIG. 14 shows spherical aberration curves, astigmatic field curves and a distortion curve of the image lens assembly according to the 7th embodiment.

FIG. 13 is a schematic view of an image lens assembly according to the 7th embodiment of the present disclosure. FIG. 14 shows spherical aberration curves, astigmatic field curves and a distortion curve of the image lens assembly according to the 7th embodiment. In FIG. 13, the image lens assembly includes, in order from an object side to an image side, a first lens element 710, an aperture stop 700, a second lens element 720, a third lens element 730, a fourth lens element 740, a fifth lens element 750, a sixth lens element 760, an IR-cut filter 780 and an image plane 770.

The first lens element 710 with positive refractive power has a convex object-side surface 711 and a concave image-side surface 712. The first lens element 710 is made of plastic material and has the object-side surface 711 and the image-side surface 712 being aspheric.

The second lens element 720 with positive refractive power has a convex object-side surface 721 and a concave image-side surface 722. The second lens element 720 is made of plastic material and has the object-side surface 721 and the image-side surface 722 being aspheric.

The third lens element 730 with positive refractive power has a convex object-side surface 731 and a convex image-side surface 732. The third lens element 730 is made of plastic material and has the object-side surface 731 and the image-side surface 732 being aspheric.

The fourth lens element 740 with negative refractive power has a concave object-side surface 741 and a convex image-side surface 742. The fourth lens element 740 is made of plastic material and has the object-side surface 741 and the image-side surface 742 being aspheric.

The fifth lens element 750 with positive refractive power has a convex object-side surface 751 and a concave image-side surface 752, wherein the object-side surface 751 of the fifth lens element 750 changes from convex at a paraxial region to concave at a peripheral region, and the image-side surface 752 of the fifth lens element 750 changes from concave at a paraxial region to convex at a peripheral region. The fifth lens element 750 is made of plastic material and has the object-side surface 751 and the image-side surface 752 being aspheric.

The sixth lens element 760 with positive refractive power has a convex object-side surface 761 and a concave image-side surface 762, wherein the image-side surface 762 of the sixth lens element 760 changes from concave at a paraxial region to convex at a peripheral region. The sixth lens element 760 is made of plastic material and has the object-side surface 761 and the image-side surface 762 being aspheric.

Moreover, when a central thickness of the first lens element 710 is CT1, a central thickness of the second lens element 720 is CT2, a central thickness of the third lens element 730 is CT3, a central thickness of the fourth lens element 740 is CT4, a central thickness of the fifth lens element 750 is CT5, and a central thickness of the sixth lens element 760 is CT6, CT6 is the thickest among CT1, CT2, CT3, CT4, CT5 and CT6.

The IR-cut filter 780 is made of glass, and located between the sixth lens element 760 and the image plane 770, and will not affect the focal length of the image lens assembly.

The detailed optical data of the 7th embodiment are shown in Table 13 and the aspheric surface data are shown in Table 14 below.

TABLE 13

7th Embodiment
f = 3.62 mm, Fno = 2.50, HFOV = 38.1 deg.

| Surface # | | Curvature Radius | | Thickness | Material | Index | Abbe # | Focal length |
|---|---|---|---|---|---|---|---|---|
| 0 | Object | Plano | | Infinity | | | | |
| 1 | Lens 1 | 2.680 | (ASP) | 0.327 | Plastic | 1.544 | 55.9 | 7.69 |
| 2 | | 7.141 | (ASP) | −0.011 | | | | |
| 3 | Ape. Stop | Plano | | 0.059 | | | | |
| 4 | Lens 2 | 2.675 | (ASP) | 0.324 | Plastic | 1.544 | 55.9 | 10.61 |
| 5 | | 4.770 | (ASP) | 0.241 | | | | |
| 6 | Lens 3 | 9.632 | (ASP) | 0.317 | Plastic | 1.535 | 56.3 | 7.74 |
| 7 | | −7.164 | (ASP) | 0.321 | | | | |
| 8 | Lens 4 | −0.802 | (ASP) | 0.250 | Plastic | 1.650 | 21.4 | −2.02 |
| 9 | | −2.308 | (ASP) | 0.030 | | | | |
| 10 | Lens 5 | 1.518 | (ASP) | 0.350 | Plastic | 1.535 | 56.3 | 4.41 |
| 11 | | 3.915 | (ASP) | 0.175 | | | | |
| 12 | Lens 6 | 1.339 | (ASP) | 0.970 | Plastic | 1.535 | 56.3 | 5.74 |
| 13 | | 1.776 | (ASP) | 0.492 | | | | |
| 14 | IR-cut filter | Plano | | 0.200 | Glass | 1.517 | 64.2 | — |
| 15 | | Plano | | 0.767 | | | | |
| 16 | Image | Plano | | — | | | | |

Note:
Reference wavelength (d-line) is 587.6 nm.

TABLE 14

Aspheric Coefficients

| Surface # | | | | | | |
|---|---|---|---|---|---|---|
| | 1 | 2 | 4 | 5 | 6 | 7 |
| k = | −2.7367E+00 | −2.0000E+01 | −9.1905E+00 | −1.1423E+01 | −1.6420E+01 | −1.5689E+01 |
| A4 = | −5.8877E−02 | −4.2876E−01 | −4.0791E−01 | −2.5103E−01 | −1.7332E−01 | −9.9585E−02 |
| A6 = | −1.5218E−02 | 8.0126E−01 | 7.6732E−01 | −7.1893E−02 | −2.0599E−01 | −2.1790E−01 |
| A8 = | −1.1046E−01 | −1.3444E+00 | −1.1857E+00 | 9.3354E−02 | −6.0796E−02 | 8.4959E−02 |
| A10 = | 7.1568E−02 | 1.3712E+00 | 1.1483E+00 | −3.3776E−01 | 3.2643E−01 | 1.3792E−01 |
| A12 = | −5.2634E−03 | −6.1886E−01 | −6.5028E−01 | 3.8789E−01 | −2.5277E−01 | −1.9628E−01 |
| A14 = | | | | −1.5975E−01 | 2.1556E−01 | 1.6262E−01 |

| Surface # | | | | | | |
|---|---|---|---|---|---|---|
| | 8 | 9 | 10 | 11 | 12 | 13 |
| k = | −3.4212E+00 | 1.3379E+00 | −9.2542E+00 | 3.0000E+00 | −7.8185E+00 | −3.2266E+00 |
| A4 = | −3.9556E−01 | −3.8826E−01 | 7.8826E−02 | 1.7557E−01 | −1.9002E−01 | −1.8222E−01 |
| A6 = | 6.2201E−02 | 3.4201E−01 | −1.9025E−01 | −3.8131E−01 | 3.5324E−02 | 9.7623E−02 |
| A8 = | 5.2840E−01 | −3.5371E−02 | 9.2275E−02 | 3.0878E−01 | 1.8523E−02 | −4.2574E−02 |

TABLE 14-continued

| Aspheric Coefficients | | | | | |
|---|---|---|---|---|---|
| A10 = | −6.1962E−01 | −5.1732E−02 | −3.0406E−02 | −1.7157E−01 | −1.0336E−02 | 1.2934E−02 |
| A12 = | 5.3112E−01 | 9.4920E−02 | −9.2850E−04 | 6.0698E−02 | 2.2036E−03 | −2.4524E−03 |
| A14 = | −2.0167E−01 | −3.7162E−02 | 2.3757E−03 | −1.1501E−02 | −2.3069E−04 | 2.5592E−04 |
| A16 = | | | | 8.6055E−04 | 9.7129E−06 | −1.1161E−05 |

In the optical image system according to the 7th embodiment, the definitions of f, Fno, HFOV, V4, V5, R5, R6, R12, f1, f2, f4, f5 and f6 are the same as those stated in the 1st embodiment with corresponding values for the 7th embodiment. Moreover, these parameters can be calculated from Table 13 and Table 14 as the following values and satisfy the following relationships:

| f (mm) | 3.62 | f1/f2 | 0.72 |
|---|---|---|---|
| Fno | 2.50 | f/f4 | −1.79 |
| HFOV (deg.) | 38.1 | f5/f6 | 0.77 |
| V4/V5 | 0.38 | (f/f5) + (f/f6) | 1.45 |
| \|R6/R5\| | 0.74 | f/f6 | 0.63 |
| R12/f | 0.49 | | |

Moreover, in the image lens assembly according to the 7th embodiment, when the lens elements (710-730, 750 and 760) have positive refractive power, the following relationship is satisfied:

$$0 < f/fi < 1.0, i=1,2,3,5 \text{ or } 6.$$

It will be apparent to those skilled in the art that various modifications and to variations can be made to the structure of the present invention without departing from the scope or spirit of the invention. In view of the foregoing, it is intended that the present invention cover modifications and variations of this invention provided they fall within the scope of the following claims.

What is claimed is:

1. An image lens assembly comprising, in order from an object side to an image side:
   a first lens element with positive refractive power having a convex object-side surface;
   a second lens element with refractive power;
   a third lens element with positive refractive power;
   a fourth lens element with negative refractive power;
   a fifth lens element with positive refractive power made of plastic material, and having a convex object-side surface and a concave image-side surface, wherein the object-side surface and the image-side surface of the fifth lens element are aspheric; and
   a sixth lens element with positive refractive power made of plastic material, and having a convex object-side surface and a concave image-side surface, wherein the image-side surface of the sixth lens element changes from concave at a paraxial region to convex at a peripheral region, and the object-side surface and the image-side surface of the sixth lens element are aspheric;
   wherein a focal length of the image lens assembly is f, a focal length of the fifth lens element is f5, a focal length of the sixth lens element is f6, and the following relationships are satisfied:

$$0 < f/f6 < 0.9; \text{ and}$$

$$0.4 < (f/f)(f/f6) < 1.9.$$

2. The image lens assembly of claim 1, wherein the fourth lens element has a concave object-side surface and a convex image-side surface.

3. The image lens assembly of claim 2, wherein an Abbe number of the fourth lens element is V4, an Abbe number of the fifth lens element is V5, and the following relationship is satisfied:

$$0.2 < V4/V5 < 0.6.$$

4. The image lens assembly of claim 2, wherein a curvature radius of the image-side surface of the sixth lens element is R12, the focal length of the image lens assembly is f, and the following relationship is satisfied:

$$0.30 < R12/f < 0.75.$$

5. The image lens assembly of claim 2, wherein a central thickness of the first lens element is CT1, a central thickness of the second lens element is CT2, a central thickness of the third lens element is CT3, a central thickness of the fourth lens element is CT4, a central thickness of the fifth lens element is CT5, a central thickness of the sixth lens element is CT6, and CT6 is greater than CT1, CT2, CT3, CT4 and CT5.

6. The image lens assembly of claim 2, wherein a focal length of the first lens element is f1, a focal length of the second lens element is f2, and the following relationship is satisfied:

$$-0.8 < f1/f2 < 1.4.$$

7. The image lens assembly of claim 1, wherein the object-side surface of the fifth lens element changes from convex at a paraxial region to concave at a peripheral region, and the image-side surface of the fifth lens element changes from concave at a paraxial region to convex at a peripheral region.

8. The image lens assembly of claim 7, wherein a curvature radius of an object-side surface of the third lens element is R5, a curvature radius of an image-side surface of the third lens element is R6, and the following relationship is satisfied:

$$0 < |R6/R5| < 0.95.$$

9. The image lens assembly of claim 1, wherein the focal length of the fifth lens element is f5, the focal length of the sixth lens element is f6, and the following relationship is satisfied:

$$0 < f5/f6 < 0.60.$$

10. The image lens assembly of claim 1, wherein the focal length of the image lens assembly is f, a focal length of the fourth lens element is f4, and the following relationship is satisfied:

$$-2.2 < f/f4 < -0.75.$$

11. An image lens assembly comprising, in order from an object side to an image side:
    a first lens element with positive refractive power having a convex object-side surface;
    a second lens element with refractive power;
    a third lens element with positive refractive power,
    a fourth lens element with negative refractive power having a concave object-side surface and a convex image-side surface;

a fifth lens element with positive refractive power made of plastic material, and having a convex object-side surface, wherein the object-side surface and an image-side surface of the fifth lens element are aspheric; and a sixth lens element with positive refractive power made of plastic material, and having a convex object-side surface and a concave image-side surface, wherein the image-side surface of the sixth lens element changes from concave at a paraxial region to convex at a peripheral region, and the object-side surface and the image-side surface of the sixth lens element are aspheric;

wherein a focal length of the image lens assembly is f, a focal length of the fifth lens element is f5, a focal length of the sixth lens element is f6, and the following relationships are satisfied:

$0 < f5/f6 < 1.0$; and $0.4 < (f/f5) + (f/f6) < 1.9$.

12. The image lens assembly of claim 10, wherein the focal length of the image lens assembly is f, a focal length of the fourth lens element is f4, and the following relationship is satisfied:

$-2.2 < f/f4 < -0.75$.

13. The image lens assembly of claim 12, wherein an Abbe number of the fourth lens element is V4, an Abbe number of the fifth lens element is V5, and the following relationship is satisfied:

$0.2 < V4/V5 < 0.6$.

14. The image lens assembly of claim 12,
wherein a central thickness of the first lens element is CT1, a central thickness of the second lens element is CT2, a central thickness of the third lens element is CT3, a central thickness of the fourth lens element is CT4, a central thickness of the fifth lens element is CT5, a central thickness of the sixth lens element is CT6, and CT6 is greater than CT1, CT2, CT3, CT4 and CT5.

15. The image lens assembly of claim 12, wherein a focal length of the first lens element is f1, a focal length of the second lens element is f2, and the following relationship is satisfied:

$-0.8 < f1/f2 < 1.4$.

16. The image lens assembly of claim 11, wherein the object-side surface of the fifth lens element changes from convex at a paraxial region to concave at a peripheral region, and the image-side surface of the fifth lens element changes from concave at a paraxial region to convex at a peripheral region.

17. An image lens assembly comprising, in order from an object side to an image side:
a first lens element with positive refractive power having a convex object-side surface;
a second lens element with refractive power;
a third lens element with positive refractive power;
a fourth lens element with negative refractive power;
a fifth lens element with positive refractive power made of plastic material, and having a convex object-side surface, wherein the object-side surface and an image-side surface of the fifth lens element are aspheric; and
a sixth lens element with positive refractive power made of plastic material, and having a convex object-side surface and a concave image-side surface, wherein the image-side surface of the sixth lens element changes from concave at a paraxial region to convex at a peripheral region, and the object-side surface and the image-side surface of the sixth lens element are aspheric;

wherein a focal length of the image lens assembly is f, a focal length of the fourth lens element is f4, a focal length of the sixth lens element is f6, and the following relationships are satisfied:

$0 < f/f6 < 0.9$; and $-2.2 < f/f4 < -0.75$.

18. The image lens assembly of claim 17, wherein the fourth lens element has a concave object-side surface and a convex image-side surface.

19. The image lens assembly of claim 18, wherein an Abbe number of the fourth lens element is V4, an Abbe number of the fifth lens element is V5, and the following relationship is satisfied:

$0.2 < V4/V5 < 0.6$.

20. The image lens assembly of claim 18, wherein a focal length of the first lens element is f1, a focal length of the second lens element is f2, and the following relationship is satisfied:

$-0.8 < f1/f2 < 1.4$.

21. The image lens assembly of claim 17, wherein the image-side surface of the fifth lens element is concave.

22. The image lens assembly of claim 21, wherein the object-side surface of the fifth lens element changes from convex at a paraxial region to concave at a peripheral region, and the image-side surface of the fifth lens element changes from concave at a paraxial region to convex at a peripheral region.

23. The image lens assembly of claim 21, wherein a central thickness of the first lens element is CT1, a central thickness of the second lens element is CT2, a central thickness of the third lens element is CT3, a central thickness of the fourth lens element is CT4, a central thickness of the fifth lens element is CT5, a central thickness of the sixth lens element is CT6, and CT6 is greater than CT1, CT2, CT3, CT4 and CT5.

* * * * *

UNITED STATES PATENT AND TRADEMARK OFFICE
CERTIFICATE OF CORRECTION

Page 1 of 1

PATENT NO. : 8,891,183 B2
APPLICATION NO. : 13/663602
DATED : November 18, 2014
INVENTOR(S) : Tsung-Han Tsai and Ming-Ta Chou It is certified that error appears in the above-identified patent and that said Letters Patent is hereby corrected as shown below:

In the Claims (1) In column 27, line 67, Claim 1 of the issued patent reads as "$0.4 < (f/f)(f/f6) < 1.9$", but it should read as "$0.4 < (f/f5)+(f/f6) < 1.9$".

Signed and Sealed this
Seventeenth Day of March, 2015

Michelle K. Lee
*Director of the United States Patent and Trademark Office*